(12) United States Patent
Hosobuchi et al.

(10) Patent No.: US 7,158,459 B2
(45) Date of Patent: Jan. 2, 2007

(54) APPARATUS FOR DISCRIMINATING OPTICAL RECORDING MEDIUM AND METHOD FOR DISCRIMINATING OPTICAL RECORDING MEDIUM

(75) Inventors: Toshikazu Hosobuchi, Tokyo (JP); Takashi Namioka, Tokyo (JP); Yasufumi Takasugi, Tokyo (JP); Kazuo Fukunaga, Tokyo (JP); Giichi Shibuya, Tokyo (JP); Hideki Hirata, Tokyo (JP); Kazuki Suzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 44 days.

(21) Appl. No.: 10/512,493

(22) PCT Filed: Apr. 25, 2003

(86) PCT No.: PCT/JP03/05350

§ 371 (c)(1),
(2), (4) Date: Oct. 25, 2004

(87) PCT Pub. No.: WO03/091994

PCT Pub. Date: Nov. 6, 2003

(65) Prior Publication Data

US 2005/0157621 A1    Jul. 21, 2005

(30) Foreign Application Priority Data

Apr. 25, 2002    (JP) .............................. 2002-123858

(51) Int. Cl.
*G11B 5/58* (2006.01)
(52) U.S. Cl. .................................... 369/53.2
(58) Field of Classification Search ............... 369/53.2, 369/30.36
See application file for complete search history.

(56) References Cited

U.S. PATENT DOCUMENTS 4,392,255 A * 7/1983 Del Giudice ............... 455/328

(Continued)

FOREIGN PATENT DOCUMENTS

JP    52-150602    12/1977

(Continued)

*Primary Examiner*—Thang V. Tran
*Assistant Examiner*—Van T. Pham
(74) *Attorney, Agent, or Firm*—Seed IP Law Group PLLC

(57) ABSTRACT

It is an object of the present invention to provide an apparatus for discriminating an optical recording medium which can reliably discriminate the kind of an optical recording medium even in the case where the optical recording medium to be discriminated is warped and formed with periodical undulation in the circumferential direction thereof.

The apparatus 10 for discriminating an optical recording medium according to the present invention includes a first electrode 11, a second electrode 12, a third electrode 13, a fourth electrode 14, an alternating current signal generation circuit 17 for applying an alternating current signal A to the first electrode 11 and the third electrode 13, a detection circuit 18 for detecting the level of an alternating current signal B1 appearing at the second electrode 12 and the level of an alternating current signal B2 appearing at the fourth electrode 14, a supporting mechanism 15 for supporting the first electrode 11 and the second electrode 12, a supporting mechanism 16 for supporting the third electrode 13 and the fourth electrode 14, a driving mechanism 33 for vertically moving the supporting mechanism 15, a driving mechanism 34 for vertically moving the supporting mechanism 16, and a control circuit 19 for controlling the operations of the alternating current signal generation circuit 17, the detection circuit 18, the driving mechanism 33 and the driving mechanism 34, and a table 19a is provided in the control circuit 19.

18 Claims, 27 Drawing Sheets

U.S. PATENT DOCUMENTS

| | | | |
|---|---|---|---|
| 5,287,342 A * | 2/1994 | Kishi et al. | 369/126 |
| 5,389,475 A * | 2/1995 | Yanagisawa et al. | 430/19 |
| 2004/0114913 A1* | 6/2004 | Kume | 386/125 |
| 2005/0007924 A1* | 1/2005 | Nishiuchi et al. | 369/53.2 |

FOREIGN PATENT DOCUMENTS

| | | | |
|---|---|---|---|
| JP | 10-055601 | * | 2/1998 |
| JP | 10055601 | | 2/1998 |
| JP | 10-143986 | * | 5/1998 |

* cited by examiner

FIG. 2
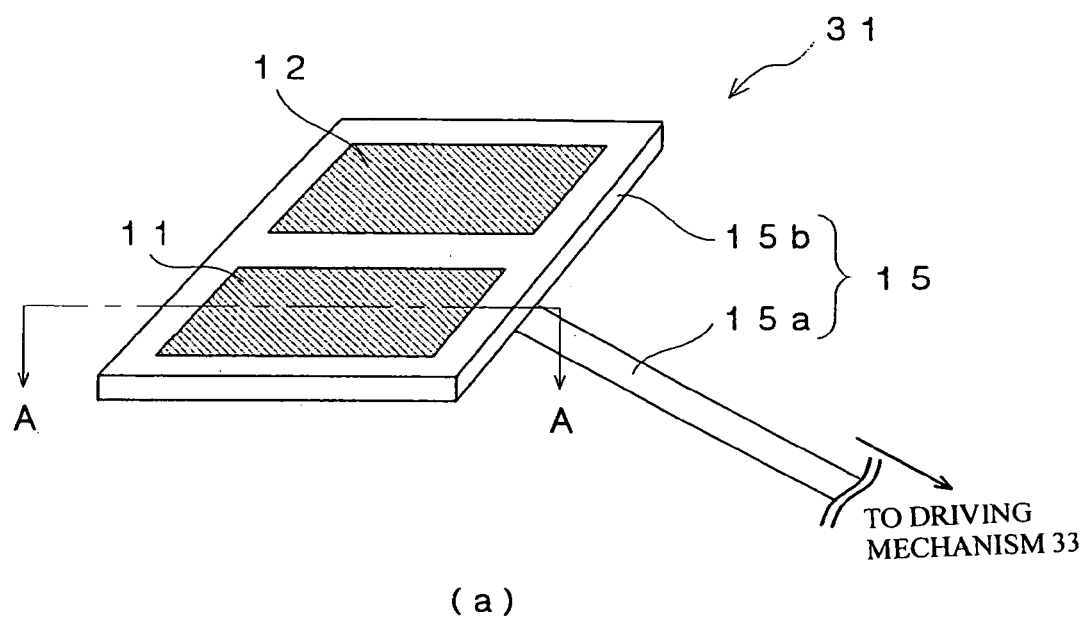
(a)
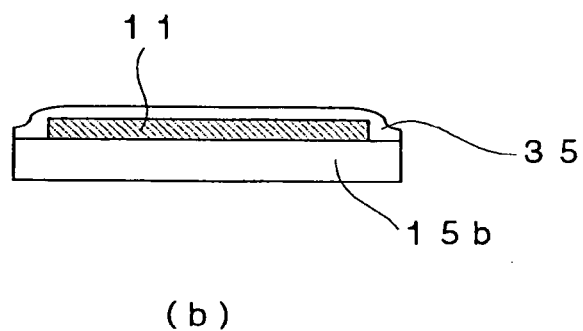
(b)

TO DRIVING MECHANISM 33

FIG. 9
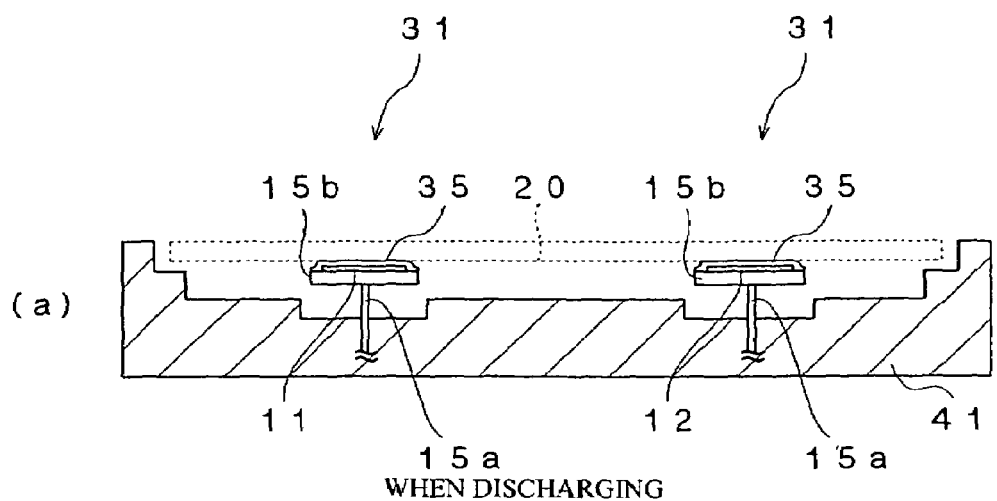
(a) WHEN DISCHARGING
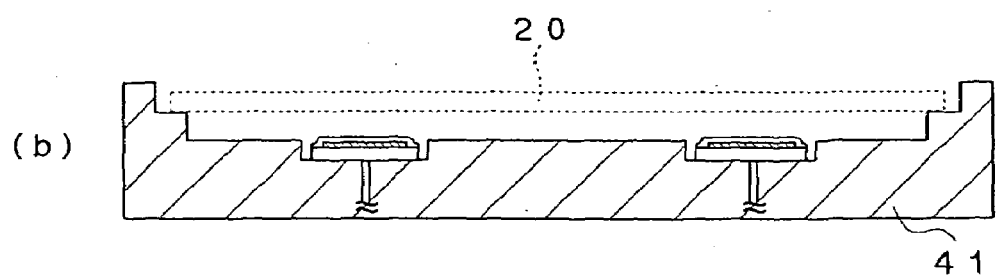
(b) WHEN ACCOMMODATING

FIG. 25
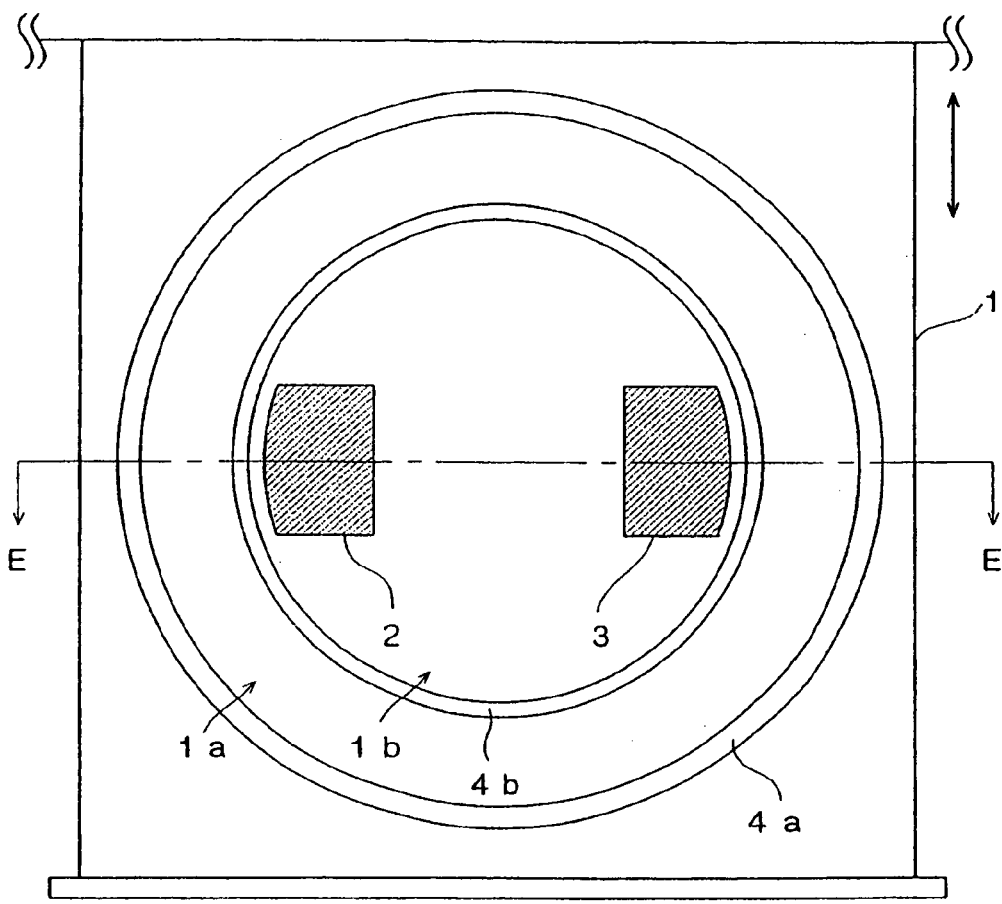
(a) *(Prior Art)*
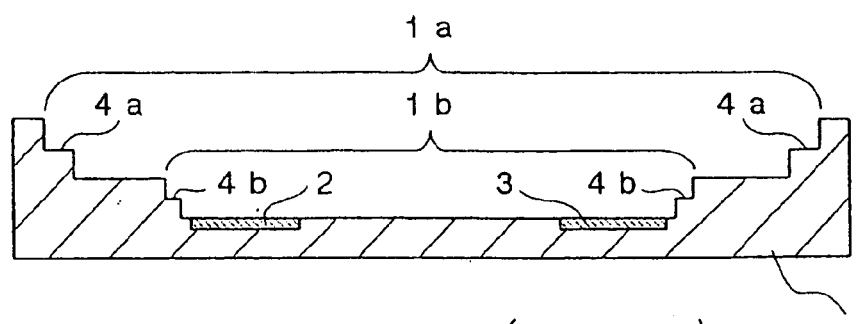
(b) *(Prior Art)*

FIG. 26
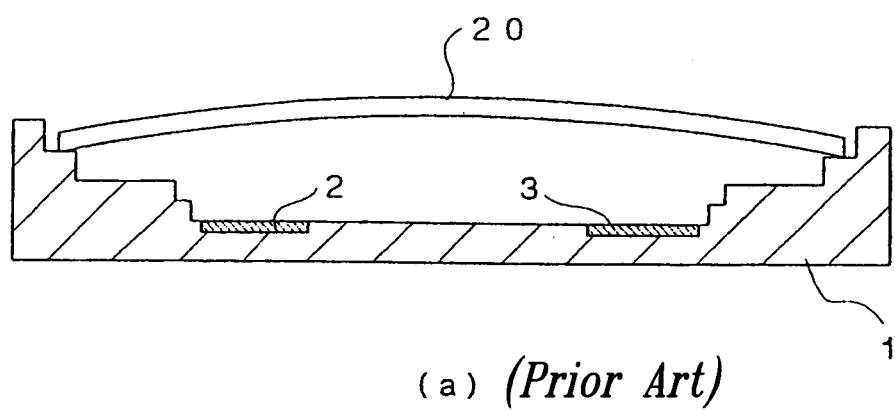
(a) *(Prior Art)*
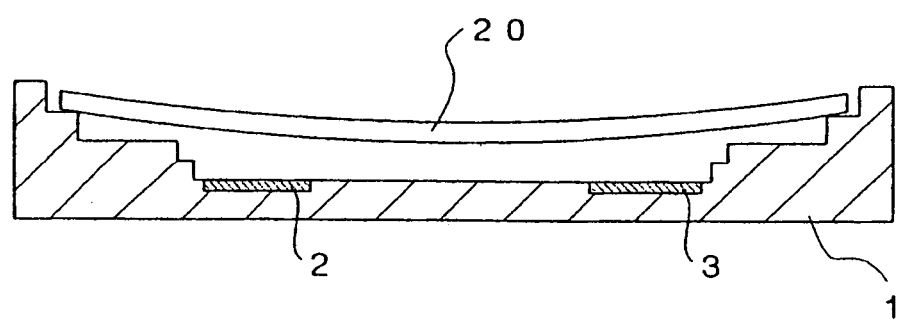
(b) *(Prior Art)*

20 *(Prior Art)*

FIG. 29
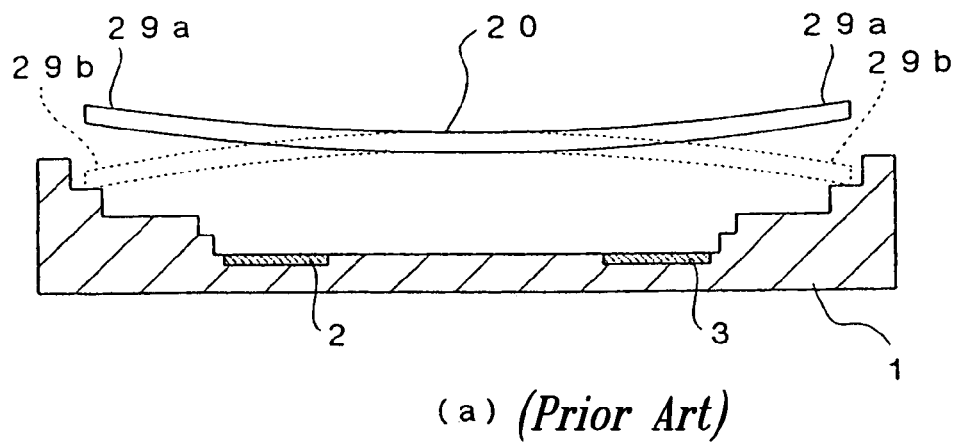
(a) *(Prior Art)*
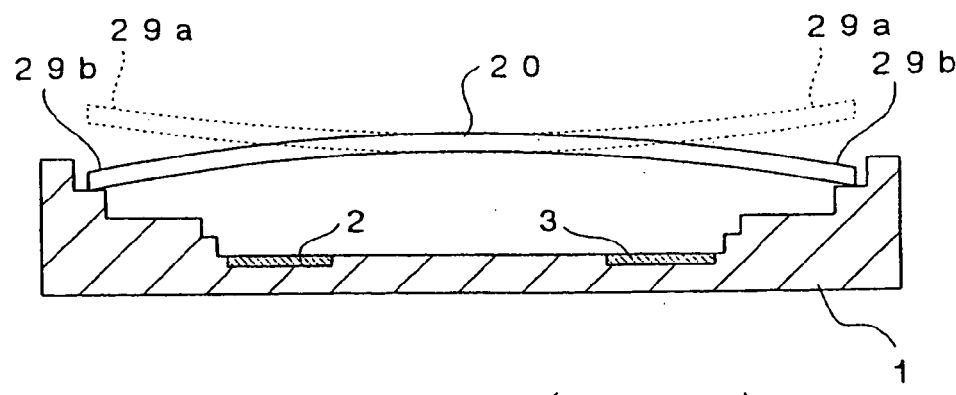
(b) *(Prior Art)*

APPARATUS FOR DISCRIMINATING OPTICAL RECORDING MEDIUM AND METHOD FOR DISCRIMINATING OPTICAL RECORDING MEDIUM

BACKGROUND OF THE INVENTION

The present invention relates to an apparatus for discriminating an optical recording medium and a method for discriminating an optical recording medium, and particularly, to an apparatus for discriminating an optical recording medium and a method for discriminating an optical recording medium which can reliably discriminate the kind of an optical recording medium.

DESCRIPTION OF THE PRIOR ART

Optical recording media such as the CD, DVD and the like have been widely used as recording media for recording digital data and compatible drives capable of reproducing data recorded in different optical recording media such as the CD, DVD and the like or recording and reproducing data therein and therefrom have recently been actively developed.

Particularly, next-generation type optical recording media having large data recording capacity and an extremely high data transfer rate have recently been actively developed and it is expected that the kinds of optical recording media will further increase.

In such a compatible drive, it is necessary to discriminate the kind of an optical recording medium set therein but since the shapes of these different kinds of optical recording media are standardized, it is impossible to discriminate the kind of an optical recording medium set therein based on the shape thereof.

Therefore, a compatible drive is generally constituted so as to discriminate the kind of an optical recording medium set therein by actually projecting a laser beam onto the optical recording medium set therein and judging whether or not a normal signal can be reproduced.

For example, a compatible drive capable of reproducing data recorded in both CD and DVD is constituted so that when a distance between a light incidence plane and a recording layer (reflective layer) is measured by conducting focus searching and it is judged that the distance between the light incidence plane and the recording layer (reflective layer) is about 1.1 mm, a laser beam having a wavelength of 780 nm for a CD is selected and that when it is judged that the distance between the light incidence plane and the recording layer (reflective layer) is about 0.6 mm, a laser beam having a wavelength of 650 nm for a DVD is selected.

However, in the case of discriminating the kind of an optical recording medium by conducting focus searching in this manner, a long time is required for discriminating the kind of the optical recording medium and a long period is required between the time when the optical recording medium is set in the drive and the time when data can be actually recorded in or reproduced from the optical recording medium.

Therefore, Japanese Patent Application Laid Open No. 10-143986 proposes a method for discriminating an optical recording medium by providing an electrode in a tray of a drive and applying an alternating current signal to the electrode, thereby discriminating the kind of an optical recording medium placed on the tray.

However, in the method disclosed in Japanese Patent Application Laid Open No. 10-143986, the discriminating accuracy is lowered as described below when the optical recording medium to be discriminated is warped.

FIG. 25 shows a tray provided with an electrode for detection that is used in Japanese Patent Application Laid Open No. 10-143986, where FIG. 25($a$) is a schematic plan view thereof and FIG. 25($b$) is a schematic cross-sectional view taken along a line E-E in FIG. 25($a$).

As shown in FIGS. 25($a$) and 25($b$), the tray 1 includes a first setting portion 1a on which an optical recording medium having a diameter of 120 mm is to be placed and a second setting portion 1b which is provided at a central portion of the first setting portion 1a and on which an optical recording medium having a diameter of 80 mm is to be placed and electrodes 2, 3 are provided in the second setting portion 1b.

Further, a shoulder portion 4a is provided on the outer circumferential portion of the first setting portion 1a so that when an optical recording medium having a diameter of 120 mm is placed on the tray 1, the optical recording medium is held on the shoulder portion 4a.

Similarly, a shoulder portion 4b is provided on the outer circumferential portion of the second setting portion 1b so that when an optical recording medium having a diameter of 80 mm is placed on the tray 1, the optical recording medium is held on the shoulder portion 4b.

Therefore, when an optical recording medium is placed on the tray 1, the recording surface of the optical recording medium (which in the case of an optical recording medium having a diameter of 120 mm is a region in which data are recorded that corresponds to that of the light incidence plane and has an inner diameter of 50 mm and an outer diameter of 117 mm) is kept from being brought into direct contact with the tray 1, thereby preventing the recording surface of the optical recording medium from being damaged.

FIG. 26 is a schematic cross-sectional view showing the state of an optical recording medium having a diameter of 120 mm placed on the tray 1, wherein FIG. 26($a$) shows the state where the optical recording medium is warped in one direction and FIG. 26($b$) shows the state where the optical recording medium is warped in the other direction. In FIGS. 26($a$) and ($b$), the warpage of the optical recording medium is exaggerated.

As apparent from FIGS. 26($a$) and ($b$), in the case where an optical recording medium is warped in the one direction, distances between the electrodes 2, 3 for detection provided in the tray 1 and a conductive layer(s) such as a reflective layer included in the optical recording medium become longer than that in the case where the optical recording medium is not warped and, on the other hand, in the case where an optical recording medium is warped in the other direction, the distances between the electrodes 2, 3 for detection provided in the tray 1 and a conductive layer(s) such as a reflective layer included in the optical recording medium becomes shorter than that in the case where the optical recording medium is not warped. As a result, when an alternating current signal is applied to one of the electrodes 2, 3, the level of the signal obtained from the other electrode 2, 3 depends upon whether or not the optical recording medium is warped and in which direction the optical recording medium is warped and, therefore, there arises a risk of the decrease in discriminating accuracy.

Further, in the method disclosed in Japanese Patent Application Laid Open No. 10-143986, the discriminating accuracy is lowered as described below when there is undulation or the like on the optical recording medium to be discriminated in the circumferential direction thereof.

FIG. 27 is a schematic perspective view showing an optical recording medium formed with periodical undulation in the circumferential direction thereof. FIG. 28(a) is a schematic cross-sectional view taken along a line C—C in FIG. 27 and FIG. 28(b) is a schematic cross-sectional view taken along a line D—D in FIG. 2.

As shown in FIG. 27, the optical recording medium 20 is formed with four convex portions 29a and four concave portions 29b in the circumferential direction thereof and in FIG. 27 and FIG. 28(a), the convex portions 29a and the concave portions 29b are exaggerated.

In the case where the optical recording medium 20 is formed with periodical undulation in the circumferential direction thereof in this manner, the optical recording medium 20 is warped in one direction at one cross-section thereof (cross-section along the line C—C in FIG. 27) and is warped in the other direction at another cross-section (cross-section along the line D—D in FIG. 27). As a result, in the case where the optical recording medium 20 is placed on the tray 1 shown in FIG. 25, distances between the electrodes 2, 3 for detection and conductive layers such as a reflective layer included in the optical recording medium 20 greatly vary depending upon how the optical recording medium 20 is placed on the tray 1.

FIG. 29 is a schematic cross-sectional view showing the state where the optical recording medium 20 is placed on the tray 1, where FIG. 29(a) shows the case where a line connecting the electrodes 2, 3 substantially coincides with the line C—C in FIG. 27 and FIG. 29(b) shows the case where a line connecting the electrodes 2, 3 substantially coincides with the line D—D in FIG. 27. The cross-section corresponding to the concave portion 29b is indicated by a broken line in FIG. 29(a) and the cross-section corresponding to the convex portion 29a is indicated by a broken line in FIG. 29(b).

As shown in FIG. 29(a), in the case where the electrodes 2, 3 are located so as to face the convex portion 29a of the optical recording medium 20 placed on the tray 1, distances between the electrodes 2, 3 for detection provided in the tray 1 and a conductive layer(s) such as a reflective layer included in the optical recording medium become longer than that in the case where the optical recording medium is not warped and has no undulation and, on the other hand, as shown in FIG. 29(b), in the case where the electrodes 2, 3 are located so as to face the concave portion 29b of the optical recording medium 20 placed on the tray 1, distances between the electrodes 2, 3 for detection provided in the tray 1 and a conductive layer(s) such as a reflective layer included in the optical recording medium become longer than in the case where the optical recording medium is not warped and has no undulation but shorter in the case shown in FIG. 29(a). Therefore, when an alternating current signal is applied to one of the electrodes 2, 3, the level of a signal obtained from the other of the electrodes 2, 3 varies depending upon how the optical recording medium 20 is placed on the tray 1 and it is therefore difficult to accurately discriminate the kind of the optical recording medium 20.

Although this problem is not so serious in the case of discriminating a CD, DVD or other optical recording media having different focus distances, it becomes very serious in the case of discriminating optical recording media whose focus distances are the same.

In the case of discriminating optical recording media that differ little in the distance between the light incidence plane and a conductive layer such as a reflective layer, for example, in the case where a DVD in which data are to be recorded in one layer on one side and a DVD in which data are to be recorded in two layers on one side are to be discriminated, the results of discrimination are greatly affected by changes in detection signals caused by the warpage of the optical recording media.

It is particularly worthy of note that there are being developed next-generation type optical recording media constituted so as to be irradiated with a laser beam having a wavelength equal to or shorter than 450 nm via a light transmission layer disposed opposite to a substrate using an objective lens having a numerical aperture equal to or smaller than 0.7. It is therefore expected that a plurality kinds of next-generation type optical recording media that differ only slightly in the thickness and material of the light transmission layers will come into practical use. In the case where these next-generation type optical recording media are discriminated using the method disclosed in Japanese Patent Application Laid Open No. 10-143986, the results of the discrimination are very greatly affected by changes in detection signals caused by warpage of the optical recording media and periodical undulation formed thereon in the circumferential direction thereof.

SUMMARY OF THE INVENTION

It is therefore an object of the present invention to provide an apparatus for discriminating an optical recording medium and a method for discriminating an optical recording medium which can reliably discriminate the kind of an optical recording medium.

It is another object of the present invention to provide an apparatus for discriminating an optical recording medium and a method for discriminating an optical recording medium which can reliably discriminate the kind of an optical recording medium even in the case where the optical recording medium to be discriminated is warped and formed with periodical undulation in the circumferential direction thereof.

It is a further object of the present invention to provide an apparatus for discriminating an optical recording medium and a method for discriminating an optical recording medium constituted so as to be irradiated with a laser beam from a side opposite to a substrate, which can reliably discriminate the kind of an optical recording medium.

The above objects of the present invention can be accomplished by an apparatus for discriminating an optical recording medium comprising at least a first dielectric layer, a second dielectric layer and a conductive layer formed between the first dielectric layer and the second dielectric layer, the apparatus for discriminating an optical recording medium comprising a first detecting section provided with an electrode and disposable in the vicinity of a surface of the first dielectric layer, a second detecting section provided with an electrode and disposable in the vicinity of a surface of the second dielectric layer and a signal applying means for applying a signal for detection to the electrode of the first detecting section and the electrode of the second detecting section.

According to the present invention, since the kind of an optical recording medium is discriminated by locating the first detecting section and the second detecting section in the vicinity of the surfaces of the first dielectric layer and the second dielectric layer of the optical recording medium and applying a signal for detection to the electrodes, it is possible to accurately discriminate the kind of an optical recording medium even in the case where the optical recording medium is warped and formed with periodical undulation in the circumferential direction thereof.

In this specification, the statement that the first detecting section is disposable in the vicinity of the surface of the first dielectric layer includes a case where the first detecting section can be disposed close to the surface of the first dielectric layer and a case where the first detecting section can be disposed in contact with the surface of the first dielectric layer and the statement that the second detecting section is disposable in the vicinity of the surface of the second dielectric layer includes a case where the second detecting section can be disposed close to the surface of the second dielectric layer and a case where the second detecting section can be disposed in contact with the surface of the second dielectric layer.

In a preferred aspect of the present invention, the apparatus for discriminating an optical recording medium further comprises a driving means for moving the first detection section to a position in the vicinity of the surface of the first dielectric layer and away from the surface of the first dielectric layer and moving the second detection section to a position in the vicinity of the surface of the second dielectric layer and away from the surface of the second dielectric layer, the driving means being constituted so as to locate the first detecting section and the second detecting section at positions in the vicinity of the surfaces of the first dielectric layer and the second dielectric layer where the first detecting section and the second detecting section do not face each other.

In a further preferred aspect of the present invention, the driving means is constituted so as to simultaneously locate the first detecting section and the second detecting section at positions in the vicinity of the surfaces of the first dielectric layer and the second dielectric layer and the signal applying means is constituted so as to simultaneously apply signals for detection to the electrode of the first detecting section and the electrode of the second detecting section.

According to this preferred aspect of the present invention, since the kind of an optical recording medium can be discriminated while the first detecting section and the second detecting section are simultaneously located at positions in the vicinity of the surfaces of the first dielectric layer and the second dielectric layer where the first detecting section and the second detecting section do not face each other and signals for detection are simultaneously applied to the electrode of the first detecting section and the electrode of the second detecting section, it is possible to quickly discriminate the kind of an optical recording medium.

In a further preferred aspect of the present invention, the driving means includes a first driving means for moving the first detection section to a position in the vicinity of the surface of the first dielectric layer and away from the surface of the first dielectric layer and a second driving means for moving the second detection section to a position in the vicinity of the surface of the second dielectric layer and away from the surface of the second dielectric layer.

In another preferred aspect of the present invention, the apparatus for discriminating an optical recording medium further comprises a driving means for moving the first detection section to a position in the vicinity of the surface of the first dielectric layer and away from the surface of the first dielectric layer and moving the second detection section to a position in the vicinity of the surface of the second dielectric layer and away from the surface of the second dielectric layer, the driving means being constituted so as to locate the first detecting section and the second detecting section at positions in the vicinity of the surfaces of the first dielectric layer and the second dielectric layer where the first detecting section and the second detecting section face each other.

In a further preferred aspect of the present invention, the driving means is constituted so as to move one of the first detecting section and the second detecting section to a position in the vicinity of one of the first dielectric layer and the second dielectric layer while keeping the other of the first detecting section and the second detecting section away from the other of the first dielectric layer and the second dielectric layer and the signal applying means is constituted so as to selectively apply a signal for detection to one of the electrode of the first detecting section and the electrode of the second detecting section.

In a further preferred aspect of the present invention, the driving means is constituted as a single driving means.

According to this preferred aspect of the present invention, since the driving means is constituted as a single driving means, it is possible to reduce space required for mounting the driving means on a drive.

In a further preferred aspect of the present invention, the driving means is constituted so as to bring the first detecting section into contact with the surface of the first dielectric layer and bring the second detecting section into contact with the surface of the second dielectric layer.

According to this preferred aspect of the present invention, since the driving means is constituted so as to bring the first detecting section into contact with the surface of the first dielectric layer and bring the second detecting section into contact with the surface of the second dielectric layer, it is possible to accurately discriminate the kind of an optical recording medium.

In a preferred aspect of the present invention, at least one of the first detecting section and the second detecting section is disposed on a tray of a drive.

According to this preferred aspect of the present invention, since at least one of the first detecting section and the second detecting section is disposed on a tray of a drive, the kind of an optical recording medium can be discriminated immediately after the optical recording medium is placed on the tray of the drive and it is therefore possible to shorten time required for recording data in or reproducing data from the optical recording medium after the optical recording medium is set in the tray.

In a further preferred aspect of the present invention, at least one of the electrode of the first detecting section and the electrode of the second detecting section is disposed around a center of a tray of a drive on which the optical recording medium is to be placed over substantially 180 degrees.

According to this preferred aspect of the present invention, since the electrode used for discriminating the kind of an optical recording medium is disposed around a center of a tray of a drive on which the optical recording medium is to be placed over substantially 180 degrees, it is possible to accurately discriminate the kind of an optical recording medium even in the case where the optical recording medium is warped and formed with periodical undulation in the circumferential direction thereof.

In a further preferred aspect of the present invention, at least one of the electrode of the first detecting section and the electrode of the second detecting section includes a first electrode to which a signal for detection is applied and a second electrode at which a signal depending upon the kind of an optical recording medium appears in response to application of the signal for detection to the first electrode.

In a further preferred aspect of the present invention, the first electrode and the second electrode are disposed to be spaced from each other and to form at least a part of a substantially annular portion around the center of the tray.

In a further preferred aspect of the present invention, the first electrode and the second electrode are disposed to be spaced from each other in a circumferential direction of the optical recording medium to be placed on the tray and over substantially 180 degrees around the center of the tray.

In a further preferred aspect of the present invention, the first electrode and the second electrode are disposed to be spaced from each other in a radial direction of the optical recording medium to be placed on the tray and over substantially 180 degrees around the center of the tray.

In a further preferred aspect of the present invention, the first electrode and the second electrode are disposed to be spaced from each other in a radial direction of the optical recording medium to be placed on the tray and over substantially 360 degrees around the center of the tray.

In another preferred aspect of the present invention, at least one of the first detecting section and the second detecting section is disposed in a main body of a drive.

In a further preferred aspect of the present invention, at least one of the first detecting section and the second detecting section is constituted by a shaft of a roller of a slot-loading mechanism.

The above objects of the present invention can be also accomplished by a method for discriminating an optical recording medium comprising at least a first dielectric layer, a second dielectric layer and a conductive layer formed between the first dielectric layer and the second dielectric layer, the method for discriminating an optical recording medium comprising steps of locating a first detecting section provided with an electrode in the vicinity of a surface of the first dielectric layer, applying a signal for detection to the electrode of the first detecting section, locating a second detecting section provided with an electrode in the vicinity of a surface of the second dielectric layer, and applying a signal for detection to the electrode of the second detecting section, thereby discriminating the kind of the optical recording medium.

According to the present invention, since the kind of an optical recording medium is discriminated by locating a first detecting section provided with an electrode in the vicinity of a surface of the first dielectric layer, applying a signal for detection to the electrode of the first detecting section, locating a second detecting section provided with an electrode in the vicinity of a surface of the second dielectric layer, and applying a signal for detection to the electrode of the second detecting section, it is possible to accurately discriminate the kind of an optical recording medium even in the case where the optical recording medium is warped and formed with periodical undulation in the circumferential direction thereof.

BRIEF DESCRIPTION OF THE DRAWINGS

FIG. 2 is a diagram showing the structure of a first detecting section, wherein FIG. 2(a) is a schematic perspective view showing a first detecting section and FIG. (b) is a schematic cross-sectional view taken along a line A—A in FIG. 2(a).

FIG. 4 is a set of schematic cross-sectional views showing various kinds of optical recording media, wherein FIG. 4(a) is a schematic cross-sectional view showing a CD type optical recording medium, FIG. 4(b) is a schematic cross-sectional view showing a DVD type optical recording medium and FIG. 4(c) is a schematic cross-sectional view showing a next-generation type optical recording medium.

FIG. 9 is a schematic cross-sectional view showing a tray of a drive on which an apparatus for discriminating an optical recording medium that is another preferred embodiment of the present invention is mounted, wherein FIG. 9(a) shows the state where a tray is discharged from a main body and FIG. 9(b) shows the state where the tray is accommodated in the main body.

FIG. 10 is a schematic longitudinal cross-sectional view showing another example of a method for mounting an apparatus for discriminating an optical recording medium on a drive and FIG. 10(b) is a schematic cross-sectional view taken along a line B—B in FIG. 10(a).

FIG. 24 is a schematic cross-sectional view showing the state where an optical recording medium is placed on a tray, wherein FIG. 24(a) shows the case where an optical recording medium formed with no periodical undulation in the circumferential direction thereof is placed on the tray and FIGS. 24(b) and(c) shows the cases where an optical recording medium formed with a periodical undulation in the circumferential direction thereof is placed on the tray.

FIG. 25 shows a tray provided with an electrode for detection that is used in a conventional apparatus for discriminating an optical recording medium, where FIG. 25(a) is a schematic plan view thereof and FIG. 25 (b) is a schematic cross-sectional view taken along a line E—E in FIG. 25 (a).

FIG. 26 is a schematic cross-sectional view showing the state of an optical recording medium placed on a tray, wherein FIG. 26(a) shows the state where the optical recording medium is warped in one direction and FIG. 26(b) shows the state where the optical recording medium is warped in the other direction.

FIG. 29 is a schematic cross-sectional view showing the state where an optical recording medium is placed on a tray, wherein FIG. 29 (a) shows the case where a line connecting electrodes for detection substantially coincides with the line C—C in FIG. 27 and FIG. 29(b) shows the case where a line connecting the electrodes for detection substantially coincides with the line D—D in FIG. 27.

DESCRIPTION OF THE PREFERRED EMBODIMENTS

Preferred embodiments of the present invention will now be described with reference to accompanying drawings.

Figure 1:
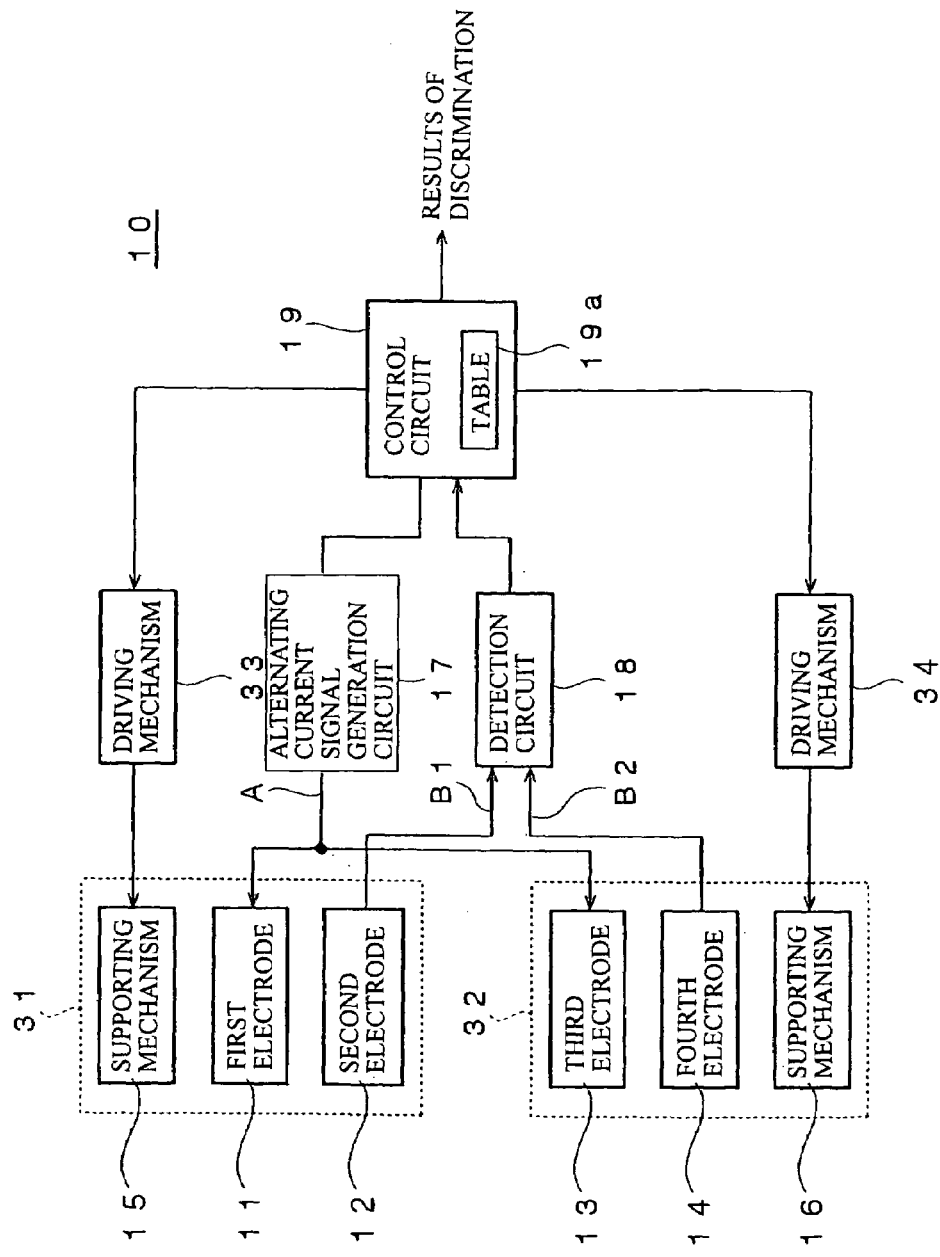
FIG. 1 is a block diagram showing an apparatus for discriminating an optical recording medium that is a preferred embodiment of the present invention.

FIG. 1 is a block diagram showing an apparatus for discriminating an optical recording medium that is a preferred embodiment of the present invention.

As shown in FIG. 1, an apparatus 10 for discriminating an optical recording medium that is a preferred embodiment of the present invention includes a first electrode 11, a second electrode 12, a third electrode 13, a fourth electrode 14, an alternating current signal generation circuit 17 for applying an alternating current signal A to the first electrode 11 and the third electrode 13, a detection circuit 18 for detecting the level of an alternating current signal B1 appearing at the second electrode 12 and the level of an alternating current signal B2 appearing at the fourth electrode 14, a supporting mechanism 15 for supporting the first electrode 11 and the second electrode 12, a supporting mechanism 16 for supporting the third electrode 13 and the fourth electrode 14, a driving mechanism 33 for vertically moving the supporting mechanism 15, a driving mechanism 34 for vertically moving the supporting mechanism 16, and a control circuit 19 for controlling the operations of the alternating current signal generation circuit 17, the detection circuit 18, the driving mechanism 33 and the driving mechanism 34. A table 19a is provided in the control circuit 19.

As shown in FIG. 1, a first detecting section 31 is constituted by the first electrode 11, the second electrode 12 and the supporting mechanism 15 for supporting the first electrode 11 and the second electrode 12 and a second detection section 32 is constituted by the third electrode 13, the fourth electrode 14 and the supporting mechanism 16 for supporting the third electrode 13 and the fourth electrode 14.

FIG. 2 is a diagram showing the structure of the first detecting section 31, wherein FIG. 2(a) is a schematic perspective view showing the detecting section 31 and FIG. (b) is a schematic cross-sectional view taken along a line A—A in FIG. 2(a).

As shown in FIG. 2(a), the supporting mechanism 15 is constituted by an arm 15a adapted to be vertically moved by the driving mechanism 33 and a plate-like electrode mounting section 15b provided at the tip end portion of the arm 15a.

The first electrode 11 and the second electrode 12 are mounted on the electrode mounting section 15b and, as shown in FIG. 2(b), the surfaces of the first electrode 11 and the second electrode 12 are covered with a protective layer 35.

The protective layer 35 serves to prevent the first electrode 11 and the second electrode 12 from being corroded and also prevent the first electrode 11 and the second electrode 12 from coming into contact with a recording surface of an optical recording medium, thereby preventing the recording surface of the optical recording medium from being damaged by the first electrode 11 and the second electrode 12.

Therefore, it is necessary for the protective layer 35 to be formed of a material having good moisture-resistant property, good surface lubricating property, rubber elasticity, lower hardness than that forming a recording surface of an optical recording medium, good heat resistant property, good chemical resistant property and good molding property, and it is preferable to form the protective layer 35 of thermoplastic polyether ester elastomer, silicon resin, fluorocarbon resin or the like.

Although not shown, the second detection section 32 has a similar structure to that of the first detection section 31. Specifically, the supporting mechanism 16 of the second detection section 32 is constituted by an arm 16a adapted to be vertically moved by the driving mechanism 34 and a plate-like electrode mounting section 15b provided at the tip end portion of the arm 16a. The third electrode 13 and the fourth electrode 14 are mounted on the electrode mounting section 16b and the surfaces of the third electrode 13 and the fourth electrode 14 are covered with a protective layer 35.

The apparatus 10 for discriminating an optical recording medium is adapted to be mounted on a data recording and reproducing apparatus for recording data in and reproducing data from an optical recording medium or a data reproducing apparatus for reproducing data from an optical recording medium (hereinafter collectively referred to as "a drive").

Figure 3:
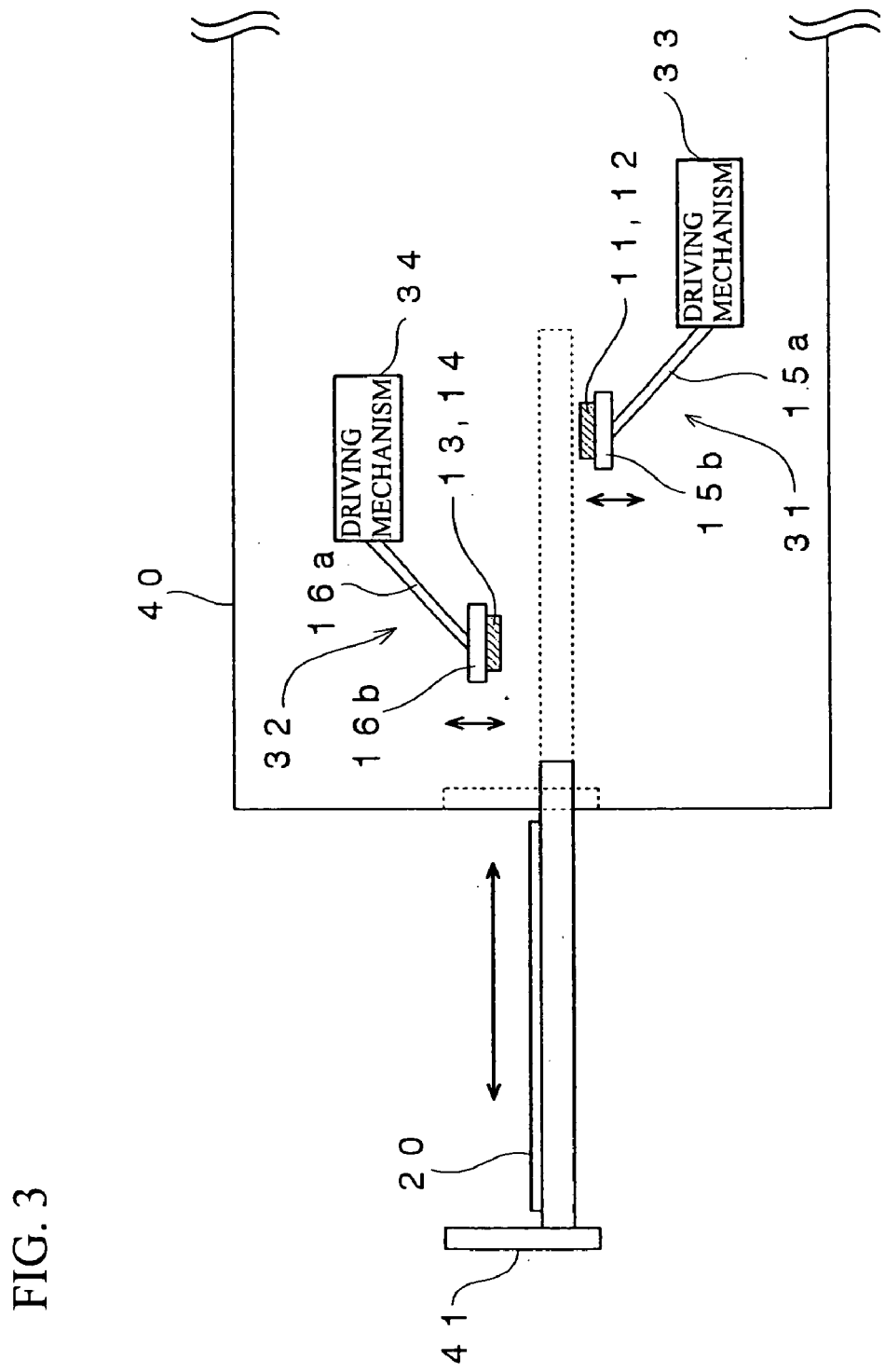
FIG. 3 is a schematic cross-sectional view showing a main body of a drive into which an apparatus for discriminating an optical recording medium that is a preferred embodiment of the present invention is incorporated.

FIG. 3 is a schematic cross-sectional view showing a main body of a drive into which an apparatus for discriminating an optical recording medium that is a preferred embodiment of the present invention is incorporated.

As shown in FIG. 3, when the tray 41 on which an optical recording medium 20 is placed is accommodated in the main body 40 of the drive, the thus constituted first detecting section 31 is located at a position where it can be brought into contact with one surface of the optical recording medium 20 by actuating the driving mechanism 33 and the second detecting section 32 is located at a position where it can be brought into contact with the other surface of the optical recording medium 20 by actuating the driving mechanism 34.

Further, as shown in FIG. 3, the first detecting section 31 and the second detecting section 31 are disposed so that they do not face each other when the first detecting section 31 comes into contact with the one surface of the optical recording medium 20 and the second detecting section 32 comes into contact with the other surface of the optical recording medium 20.

Figure 4:
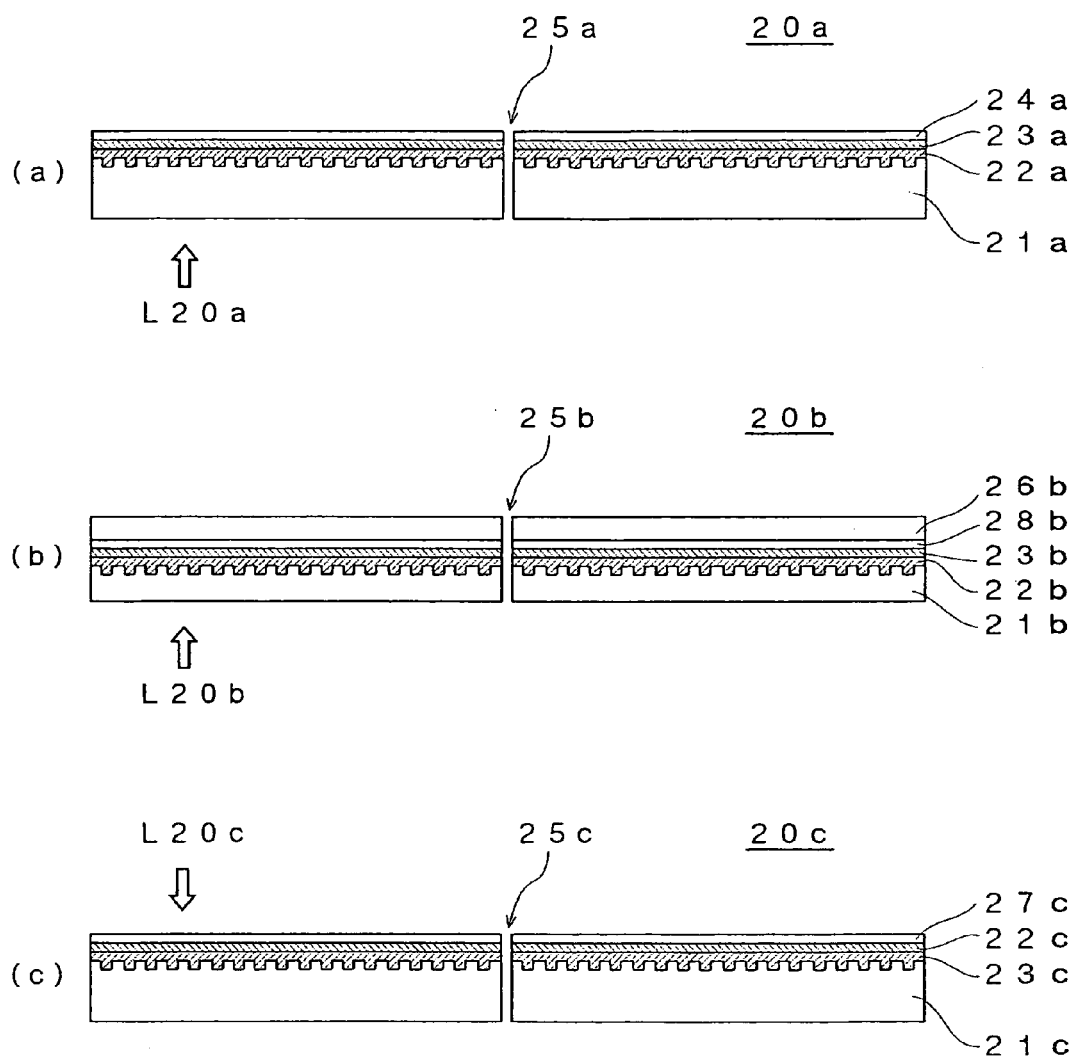

FIG. 4 is a set of schematic cross-sectional views showing various kinds of optical recording media, wherein FIG. 4(a) is a schematic cross-sectional view showing a CD type optical recording medium, FIG. 4(b) is a schematic cross-sectional view showing a DVD type optical recording medium and FIG. 4(c) is a schematic cross-sectional view showing a next-generation type optical recording medium.

As shown in FIG. 4(a), a CD type optical recording medium 20a includes a substrate 21a, a recording layer 22a formed on the substrate 21a, a reflective layer 23a formed on the recording layer 22a and a protective layer 24a formed on the reflective layer 23a, and the central portion of thereof is formed with a hole 25a. In the thus constituted CD type optical recording medium 20a, a laser beam L20a having a wavelength λ of 780 nm is projected thereonto from the side of the substrate 21a, thereby recording data therein and reproducing recorded therein.

The substrate 21a serves to ensure the mechanical strength required by the optical recording medium 20a and an optical path for a laser beam L20a is formed therein.

In the case where the optical recording medium 20a is to be constituted as a write-once optical recording medium (CD-R) or a data rewritable type optical recording medium (CD-RW), grooves and/or lands are formed on the surface of the substrate 21a. The grooves and/or lands serve as a guide track for the laser beam L20a when data are to be recorded or when data are to be reproduced.

The substrate 21a has a thickness of about 1.1 mm and is normally formed of polycarbonate resin.

In the case where the optical recording medium 20a is to be constituted as a write-once optical recording medium (CD-R) or a data rewritable type optical recording medium (CD-RW), the recording layer 22a is formed.

In the case where the optical recording medium 20a is constituted as a write-once optical recording medium (CD-R), the recording layer 22a is formed of organic dye and in the case where the optical recording medium 20a is constituted as a data rewritable type optical recording medium (CD-RW), the recording layer 22a is constituted by a phase change film and dielectric films sandwiching the phase change film.

In a write-once type optical recording medium, data are recorded in the recording layer 22a by transforming a predetermined region of organic dye contained in the recording layer 22a. On the other hand, in a data rewritable type optical recording medium, data are recorded in the recording layer 22a by changing the phase of the phase change film contained in the recording layer 22a between a crystalline state and an amorphous state.

In the case where the optical recording medium 20a is constituted as a ROM type optical recording medium (CD-ROM), no recording layer 22a is formed and data are recorded by pre-pits (not shown) formed on the surface of the substrate 21a when the optical recording medium 20a is fabricated.

The reflective layer 23a serves to reflect the laser beam L20a entering via the substrate 21a so as to emit it from the substrate 21a and is formed so as to have a thickness of 10 to 300 nm.

The reflective layer 23a is formed of metal such as aluminum, silver or the like in order to effectively reflect the laser beam L20a.

In this specification, a layer such as a reflective layer 23a having conductivity is sometimes referred to as "a conductive layer." In the case where the optical recording medium 20a is constituted as a data rewritable type optical recording medium (CD-RW), since the material of the phase change film included in the recording layer 22a normally has conductivity, the recording layer 22a falls in the category of "a conductive layer."

The protective layer 24a serves to physically and chemically protect the recording layer 22a. The protective layer 24a is formed of ultraviolet ray curable resin or the like so as to have a thickness of about 100 μm.

In the thus constituted CD type optical recording medium 20a, the distance between the surface of the substrate 21a through with the laser beam L20a enters and the reflective layer 23a or the recording layer 22a serving as a conductive layer is determined to be about 1.1 mm.

On the other hand, as shown in FIG. 4(b), the DVD type optical recording medium 20b includes a first substrate 21b, a recording layer 22b formed on the first substrate 21b, a reflective layer 23b formed on the recording layer 22b, an adhesive layer 28b formed on the reflective layer 23b and a second substrate 26b formed on the adhesive layer 28b, and the central portion of thereof is formed with a hole 25b. In the thus constituted DVD type optical recording medium 20b, a laser beam L20b having a wavelength λ of 650 nm is projected thereonto from the side of the first substrate 21b, thereby recording data therein and reproducing recorded therein.

The first substrate 21b serves to ensure the mechanical strength required by the optical recording medium 20b and the optical path of the laser beam L20b is formed therein.

In the case where the optical recording medium 20b is to be constituted as a write-once optical recording medium (DVD-R) or a data rewritable type optical recording medium (DVD-RW), grooves and/or lands are formed on the surface of the first substrate 21b. The grooves and/or lands serve as a guide track for the laser beam L20b when data are to be recorded or when data are to be reproduced.

The second substrate 26b corresponds to the protective layer 24a in the CD type optical recording medium 20a.

Each of the first substrate 21b and the second substrate 26b has a thickness of about 1.1 mm and is normally formed of polycarbonate resin.

The recording layer 22b is formed in the case where the optical recording medium 20b is to be constituted as a write-once optical recording medium (DVD-R) or a data rewritable type optical recording medium (DVD-RW).

In the case where the optical recording medium 20b is constituted as a write-once optical recording medium (DVD-R), the recording layer 22b is formed of organic dye and in the case where the optical recording medium 20b is constituted as a data rewritable type optical recording medium (DVD-RW), the recording layer 22b is constituted by a phase change film and dielectric films sandwiching the phase change film.

In the case where the optical recording medium 20b is constituted as a ROM type optical recording medium (DVD-ROM), no recording layer 22b is formed and data are recorded by pre-pits (not shown) formed on the surface of the first substrate 21b when the optical recording medium 20b is fabricated.

The reflective layer 23b serves to reflect the laser beam L20b entering via the first substrate 21b so as to emit it from the first substrate 21b and is formed so as to have a thickness of 10 to 300 nm.

The reflective layer 23b is formed of metal such as aluminum, silver or the like in order to effectively reflect the laser beam L20b.

In the thus constituted DVD type optical recording medium 20b, the distance between the surface of the first substrate 21b through with the laser beam L20b enters and the reflective layer 23b or the recording layer 22b serving as a conductive layer is determined to be about 0.6 mm.

Further, as shown in FIG. 4(c), the next-generation type optical recording medium 20c includes a substrate 21c, a reflective layer 23c formed on the substrate 21c, a recording layer 22c formed on the reflective layer 23c and a light transmission layer 27c formed on the recording layer 22c, and the central portion of thereof is formed with a hole 25c. In the thus constituted next-generation type optical recording medium 20c, a laser bream L20c having a wavelength λ of about 400 nm is projected thereonto from the side of the light transmission layer 27c located on the opposite side from the substrate 21c, thereby recording data therein and reproducing recorded therein.

The substrate 21c serves to ensure the mechanical strength required for the optical recording medium 20c and in the case where the optical recording medium 20c is to be constituted as a write-once optical recording medium or a data rewritable type optical recording medium, grooves and/or lands are formed on the surface of the substrate 21c.

Unlike in the CD type optical recording medium 20a and the DVD type optical recording medium 20b, in the next-generation type optical recording medium 20c, no optical path of the laser beam L20c is formed in the substrate 21c.

The substrate 21c has a thickness of about 1.1 mm and is normally formed of polycarbonate resin.

The reflective layer 23c serves to reflect the laser beam L20c entering via the light transmission layer 27c so as to emit it from the light transmission layer 27c and is formed so as to have a thickness of 10 to 300 nm.

The reflective layer 23c is formed of metal such as aluminum, silver or the like in order to effectively reflect the laser beam L20c.

The recording layer 22c is formed in the case where the optical recording medium 20c is to be constituted as a write-once optical recording medium or a data rewritable type optical recording medium.

In the case where the optical recording medium 20c is constituted as a ROM type optical recording medium, no recording layer 22c is formed and data are recorded by pre-pits (not shown) formed on the surface of the substrate 21c when the optical recording medium 20c is fabricated.

The light transmission layer 27c is a layer in which the optical path of the laser beam L20c is formed.

Although the thickness of the light transmission layer 27c depends upon the kind of the next-generation type optical recording medium 20c, the light transmission layer 27c is formed so as to have a thickness of about 10 to 300 μm.

Although the material preferably used for forming the light transmission layer 27c depends upon the kind of the next-generation type optical recording medium 20c, a dielectric material such as ultraviolet ray curable resin, polycarbonate, polyolefin or the like is normally employed.

Owing to the configuration of the next-generation type optical recording medium 20c in the foregoing manner, in the case where the next-generation type optical recording medium 20c is constituted as a ROM type optical recording medium or a write-once optical recording medium, the distance between the surface of the light transmission layer 27c through with the laser beam L20c enters and the reflective layer 23c serving a conductive layer is determined to be about 10 to 300 μm. On the other hand, in the case where the next-generation type optical recording medium 20c is constituted as a data rewritable type optical recording medium, the distance between the surface of the light transmission layer 27c through with the laser beam L20c enters and the recording layer 22c which is a conductive layer closest to the light transmission layer 27c is determined to be slightly shorter than the distance between the surface of the light transmission layer 27c and the reflective layer 23c.

The apparatus 10 for discriminating an optical recording medium shown in FIGS. 1 to 3 discriminates the kind of an optical recording medium 20 among the optical recording media having different structures in the above described manner as follows.

Figure 5:
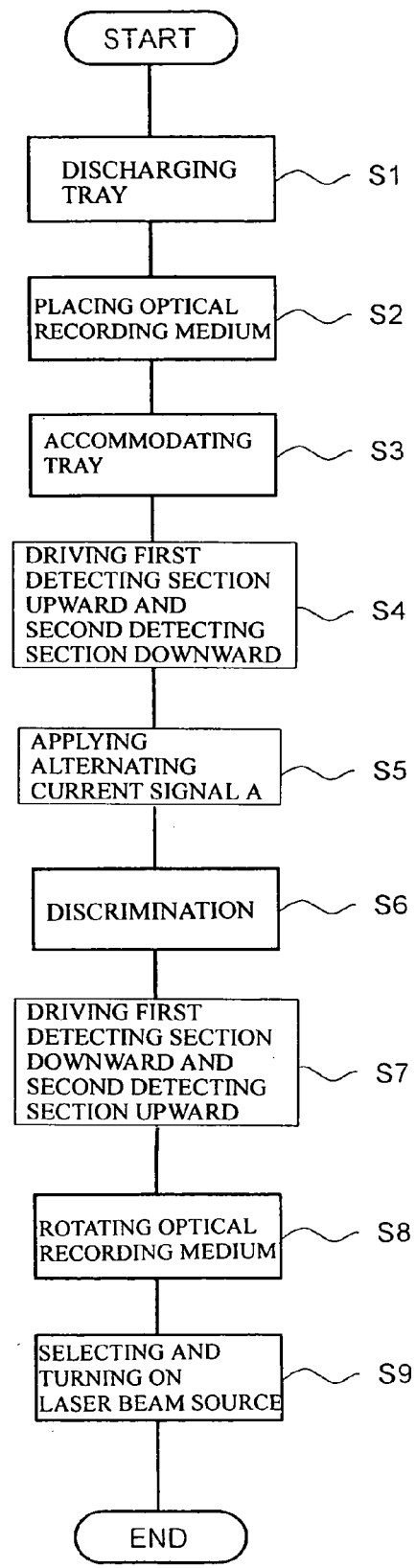
FIG. 5 is a flow chart of a method for discriminating an optical recording medium using an apparatus for discriminating an optical recording medium.

FIG. 5 is a flow chart of a method for discriminating an optical recording medium using the apparatus 10 for discriminating an optical recording medium.

In the case where the kind of an optical recording medium 20 is to be discriminated using the apparatus 10 for discriminating an optical recording medium, the tray 41 of the drive is discharged from the main body 40 of the drive (Step S1) and an optical recording medium 20 is placed on the tray 41 by the user (Step S2).

The tray 41 is then accommodated in the main body 40 of the drive (Step S3) and, correspondingly, the first detecting section 31 is moved upward in FIG. 3 by the driving mechanism 33 under the control of the control circuit 19 until the protective layer 35 comes into contact with the light incidence plane of the optical recording medium 20 and simultaneously, the second detecting section 32 is moved downward in FIG. 3 by the driving mechanism 34 under the control of the control circuit 19 until the protective layer 35 comes into contact with the surface opposite to the light incidence plane of the optical recording medium 20 (hereinafter referred to as a "reverse surface") (Step S4).

Figure 6:
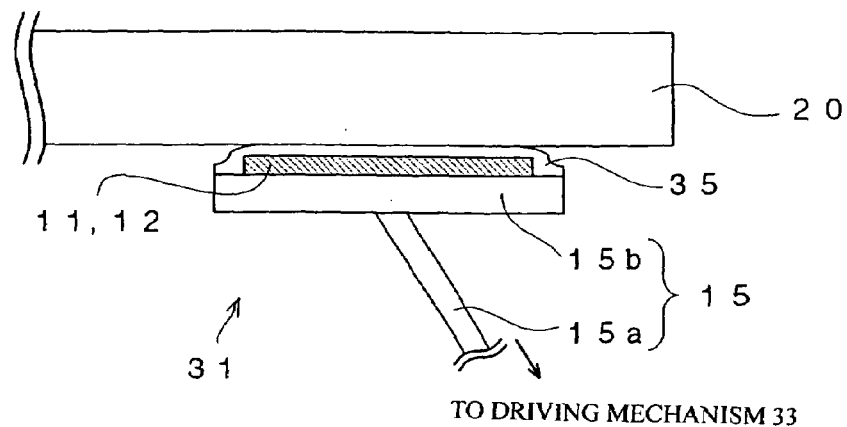
FIG. 6 is a schematic cross-sectional view showing the state where a detecting section of an apparatus for discriminating an optical recording medium is in contact with a light incidence plane of an optical recording medium.

As a result, as shown in FIG. 6, when the first detecting section 31 has come into contact with the light incidence plane of the optical recording medium 20, substantially only the protective layer 35 is interposed between the light incidence plane of the optical recording medium 20, and the first electrode 11 and the second electrode 12.

Therefore, in the case where the optical recording medium 20 placed on the tray 41 is a CD type optical recording medium 20a, the distance between the first electrode 11 and second electrode 12 and the reflective layer 23 or recording layer 22, which is a conductive layer, becomes equal to (1.1 mm+thickness of the protective layer 35) and in the case where the optical recording medium 20 placed on the tray 41 is a DVD type optical recording medium 20b, the distance between the first electrode 11 and second electrode 12 and the reflective layer 23 or recording layer 22, which is a conductive layer, becomes equal to (0.6 mm+thickness of the protective layer 35).

On the other hand, in the case where the optical recording medium 20 placed on the tray 41 is a next-generation type optical recording medium 20c, the distance between the first electrode 11 and second electrode 12 and the reflective layer 23 or recording layer 22, which is a conductive layer, becomes equal to (10 to 300 µm+thickness of the protective layer 35).

Although not shown, when the second detecting section 32 comes into contact with the reverse surface of the optical recording medium 20, substantially only the protective layer 35 is interposed between the reverse surface of the optical recording medium 20, and the third electrode 13 and the fourth electrode 14.

Therefore, distances between the third electrode 13 and fourth electrode 14 and the reflective layer 23, which is a conductive layer, depend upon the kind of the optical recording medium 20.

In this embodiment, since the surface of the protective layer 35 has good lubricating property, the light incidence plane and the reverse surface of the optical recording medium 20 is not damaged when the protective layer 35 comes into contact with the light incidence plane and the reverse surface of the optical recording medium 20.

Figure 7:
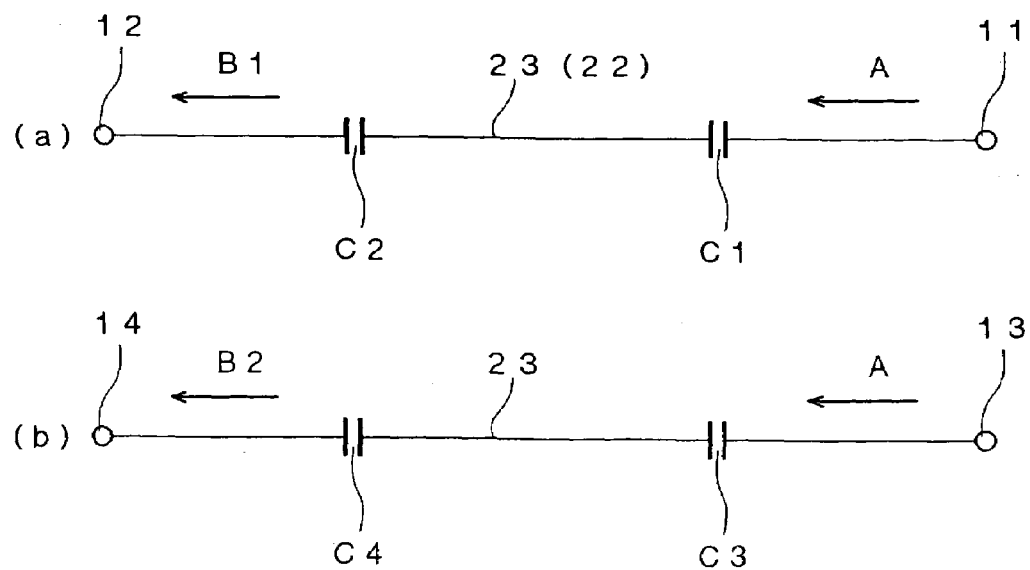
FIG. 7(a) is a diagram showing a circuit formed between a first electrode and a second electrode and FIG. 7(b) is a diagram showing a circuit formed between a third electrode and a fourth electrode.

When the first detecting section 31 comes into contact with the light incidence plane of the optical recording medium 20 in this manner, a circuit shown in FIG. 7(a) is formed between the first electrode 11 and the second electrode 12.

In FIG. 7(a), C1 is a capacitance component constituted by the first electrode 11, the reflective layer 23 or the recording layer 22 and a dielectric material present between the first electrode 11 and the reflective layer 23 or the recording layer 22, and C2 is a capacitance component constituted by the second electrode 12, the reflective layer 23 or the recording layer 22 and a dielectric material present between the second electrode 12 and the reflective layer 23 or the recording layer 22. Here, C1=C2.

Therefore, the values of the capacitance components C1 and C2 are determined depending upon the thickness and dielectric constant of the dielectric material present between the first electrode 11 and second electrode 12 and the reflective layer 23 or recording layer 22. In the case where the optical recording medium 20 placed on the tray 41 is constituted as a CD type optical recording medium 20a, they become equal to Ca1 and in the case where the optical recording medium 20 placed on the tray 41 is constituted as a DVD type optical recording medium 20b, they become equal to Cb1, where Cb1 is larger than Ca1. On the other hand, in the case where the optical recording medium 20 placed on the tray 41 is constituted as a next-generation type optical recording medium 20c, they become equal to Cc1, where Cc1 is larger than Cb1.

Similarly, when the second detecting section 32 comes into contact with the reverse surface of the optical recording medium 20, a circuit shown in FIG. 7(b) is formed between the third electrode 13 and the fourth electrode 14.

In FIG. 7(b), C3 is a capacitance component constituted by the third electrode 13, the reflective layer 23 and a dielectric material present between the third electrode 13 and the reflective layer 23, and C4 is a capacitance component constituted by the fourth electrode 14, the reflective layer 23 and a dielectric material present between the fourth electrode 14 and the reflective layer 23. Here, C3=C4.

Therefore, the values of the capacitance components C3 and C4 are determined depending upon the thickness and dielectric constant of the dielectric material present between the third electrode 13 and fourth electrode 14 and the reflective layer 23. In the case where the optical recording medium 20 placed on the tray 41 is constituted as a CD type optical recording medium 20a, they become equal to Ca2 and in the case where the optical recording medium 20 placed on the tray 41 is constituted as a DVD type optical recording medium 20b, they become equal to Cb2, where Cb2 is smaller than Ca2. On the other hand, in the case where the optical recording medium 20 placed on the tray 41 is constituted as a next-generation type optical recording medium 20c, they become equal to Cc2, where Cc2 is smaller than Cb2.

Then, alternating current signals A generated by the alternating current signal generation circuit 17 are applied to the first electrode 11 and the third electrode 13 under the control of the control circuit 19 while the first detecting section 31 is in contact with the light incidence plane of the optical recording medium 20 and the second detecting section 32 is in contact with the reverse surface of the optical recording medium 20 (Step S5).

As a result, since the alternating current signal A applied to the first electrode 11 is transmitted to the second electrode 12 via the circuit shown in FIG. 7(a) and the alternating current signal A applied to the third electrode 13 is transmitted to the fourth electrode 14 via the circuit shown in FIG. 7(b), an alternating current signal B1 appearing at the second electrode 12 varies depending upon the values of the capacitance components C1 and C2 and an alternating current signal B2 appearing at the fourth electrode 14 varies depending upon the values of the capacitance components C3 and C4.

As shown in FIG. 3, in this embodiment, when the first detecting section 31 comes into contact with the light incidence plane of the optical recording medium 20 and the second detecting section 32 comes into contact with the reverse surface of the optical recording medium 20, since the first detecting section 31 and the second detecting section 32 do not face each other, the alternating current signal B1 appearing at the second electrode 12 is not influenced by the alternating current signal A applied to the third electrode 13 and the alternating current signal B2 appearing at the fourth electrode 14 is not influenced by the alternating current signal A applied to the first electrode 11.

The alternating current signal B1 appearing at the second electrode 12 and the alternating current signal B2 appearing at the fourth electrode 14 are detected by the detection circuit 18 and the control circuit 19 discriminates the kind of the optical recording medium 20 placed on the tray 41 based on the alternating current signal B1 and the alternating current signal B2 detected by the detection circuit 18 (Step S6).

More specifically, in the case where the level of the alternating current signal B1 is equal to that obtained when the values of the capacitance components C1 and C2 are equal to Ca1 and the level of the alternating current signal B2 is equal to that obtained when the values of the capacitance components C3 and C4 are equal to Ca2, the control circuit 19 discriminates that the optical recording medium 20 placed on the tray 41 is a CD type optical recording medium 20a, and in the case where the level of the alternating current signal B1 is equal to that obtained when the values of the capacitance components C1 and C2 are equal to Cb1 and the level of the alternating current signal B2 is equal to that obtained when the values of the capacitance components C3 and C4 are equal to Cb2, the control circuit 19 discriminates that the optical recording medium 20 placed on the tray 41 is a DVD type optical recording medium 20b. On the other hand, in the case where the level of the alternating current signal B1 is equal to that obtained when the values of the capacitance components C1 and C2 are equal to Cc1 and the level of the alternating current signal B2 is equal to that obtained when the values of the capacitance components C3 and C4 are equal to Cc2, the control circuit 19 discriminates that the optical recording medium 20 placed on the tray 41 is a next-generation type optical recording medium 20c.

Therefore, if the range of the level of the alternating current signal B1 to be obtained and the range of the level of the alternating current signal B2 to be obtained are obtained in advance for each kind of the optical recording media 20 and stored as a table 19a in the control circuit 19, the kind of optical recording media 20 can be discriminated by referring to the table 19a in the control circuit 19.

When the discrimination of the kind of the optical recording medium 20 has been completed, the first detecting section 31 is moved downward in FIG. 3 by the driving mechanism 33 and the second detecting section 32 is moved upward in FIG. 3 by the driving mechanism 34 under the control of the control circuit 19 so that the first detecting section 31 is moved away from the light incidence plane of the optical recording medium 20 and the second detection section 32 is moved away from the reverse surface of the optical recording medium 20 (Step S7).

Thereafter, the optical recording medium 20 is rotated by a spindle motor (not shown) (Step S8) and a laser component and an optical system corresponding to the kind of the optical recording medium 20 discriminated at Step S6 are selected, thereby emitting a laser beam (Step S9).

Then, an initial setting operation and the like are effected similarly to in the conventional drive and data are recorded in the optical recording medium 20 or data are reproduced from the optical recording medium 20.

Therefore, if the apparatus for discriminating an optical recording medium according to this embodiment is mounted on a drive, it is possible to immediately discriminate the kind of an optical recording medium 20 set in the data recording and reproducing apparatus prior to projecting a laser beam thereon.

According to this embodiment, since the kind of an optical recording medium is discriminated while the first detecting section 31 is in contact with the surface of the optical recording medium 20 and the second detecting section 32 is in contact with the reverse surface of the optical recording medium 20, even in the case where an optical recording medium 20 to be discriminated is warped and formed with periodical undulation in the circumferential direction thereof, it is possible to accurately discriminate the kind of the optical recording medium 20 without being affected by the warpage and periodical circumferential undulation of the optical recording medium 20.

Further, according to this embodiment, since the kind of an optical recording medium 20 is discriminated using the first detecting section 31 from the side of the light incidence plane of the optical recording medium 20 and simultaneously, the kind of an optical recording medium 20 is discriminated using the second detecting section 32 from the side of the reverse surface of the optical recording medium 20, it is possible to more accurately discriminate the kind of an optical recording medium 20 than in the case where the kind of an optical recording medium 20 is discriminated from only one side of an optical recording medium 20.

Therefore, according to this embodiment, even in the case where change in a detection signal caused by the warpage of an optical recording medium greatly affects the results of discrimination of the kind of an optical recording medium 20 such as when discriminating a DVD in which data are to be recorded in one layer on one side and a DVD in which data are to be recorded in two layers on one side, in which DVDs the difference in distance between the light incidence plane and a conductive layers such as a reflective layer is small, the kind of the optical recording medium 20 can nevertheless be accurately discriminated.

Furthermore, according to this embodiment, since the kind of the optical recording medium 20 is discriminated by applying the alternating current signal A generated by the alternating current signal generation circuit 17 to the first electrode 11 and detecting an alternating current signal B1 appearing at the second electrode 12 while the first detecting section 31 is in contact with the surface of the optical recording medium 20, and applying the alternating current signal A generated by the alternating current signal generation circuit 17 to the third electrode 13 and detecting an alternating current signal B2 appearing at the fourth electrode 14 while the second detecting section 32 is in contact with the reverse surface of the optical recording medium 20, even in the case of discriminating the kinds of next-generation type optical recording media that differ only slightly in the thickness and material of the light transmission layers 27c so that the values of the capacitance components Cc1 and Cc2 are close to each other, the discrimination can be made without being affected by an air layer having a high dielectric constant. Therefore, it is possible to accurately discriminate the kind of a next-generation type optical recording medium 20 by detecting the level of the alternating current signal B1 appearing at the second electrode 12 and the level of the alternating current signal B2 appearing at the fourth electrode 14.

Moreover, according to this embodiment, since the first electrode 11, the second electrode 12, the third electrode 13 and the fourth electrode 14 are each covered with the protective layer 35 having a good lubricating property, it is possible to reliably prevent damage to the light incidence plane of an optical recording medium 20 despite the fact that the protective layer 35 comes into contact with the light incidence plane of the optical recording medium 20.

Further, according to this embodiment, since the first detecting section 31 is moved away from the light incidence plane of the optical recording medium 20 by the driving mechanism 33 and the second detecting section 32 is moved away from the reverse surface of the optical recording medium 20 by the driving mechanism 34 after discriminating the kind of the optical recording medium 20 and prior to rotation of the optical recording medium 20 by the spindle motor, it is possible to reliably prevent the first detecting section 31 and/or the second detecting section 32 from coming into contact with the light incidence plane and/or the reverse surface of the optical recording medium 20 and damaging the optical recording medium 20 when the optical recording medium 20 is being rotated.

Furthermore, according to this embodiment, since the first detecting section 31 and the second detection section 32 do not face each other when the first detecting section 31 comes into contact with the light incidence plane of the optical recording medium 20 and the second detecting section 32 comes into contact with the reverse surface of the optical recording medium 20, the alternating current signal B1 appearing at the second electrode 12 is not influenced by the alternating current signal A applied to the third electrode 13 and the alternating current signal B2 appearing at the fourth electrode 14 is not influenced by the alternating current signal A applied to the first electrode 11. Therefore, since the kind of the optical recording medium 20 can be discriminated simultaneously using the first detecting section 31 and the second detection section 32, it is possible to shorten time required for discriminating the kind of the optical recording medium 20.

Figure 8:
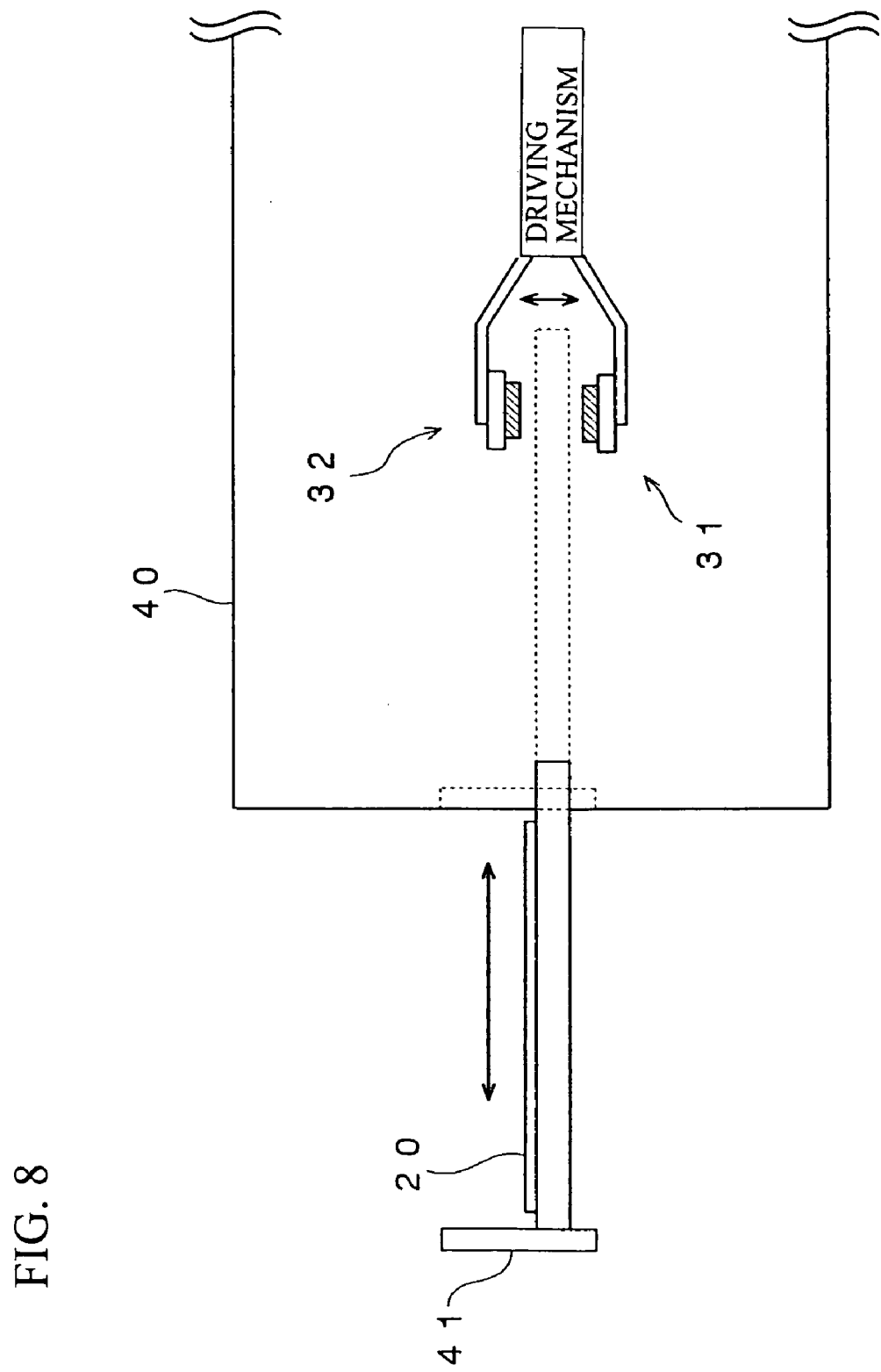
FIG. 8 is a schematic cross-sectional view showing a main body of a drive into which an apparatus for discriminating an optical recording medium that is another preferred embodiment of the present invention is incorporated.

FIG. 8 is a schematic cross-sectional view showing the main body of a drive into which an apparatus for discriminating an optical recording medium that is another preferred embodiment of the present invention is incorporated.

As shown in FIG. 8, in this embodiment, a first detecting section 31 and a second detecting section 32 of the apparatus 10 for discriminating an optical recording medium are disposed on opposite sides with respect to an optical recording medium 20 to be discriminated and are simultaneously driven by a common driving mechanism.

More specifically, when the kind of an optical recording medium 20 is discriminated using the first detecting section 31, the first detecting section 31 is moved upward by the driving mechanism until the first detecting section 31 comes into contact with the light incidence plane of the optical recording medium 20.

As a result, the second detecting section 32 is also move upward and when the first detecting section 31 comes into contact with the light incidence plane of the optical recording medium 20, the second detecting section 32 is located to be spaced from the reverse surface of the optical recording medium 20.

When the first detecting section 31 comes into contact with the light incidence plane of the optical recording medium 20, the driving mechanism is stopped, thereby keeping the first detecting section 31 at that position and an alternating current signal A generated by the alternating current signal generation circuit 17 is applied to the first electrode 11 under the control of the control circuit 19.

As a result, the alternating current signal A applied to the first electrode 11 is transmitted to the second electrode 12 via the circuit shown in FIG. 7(a) and therefore, an alternating current signal B1 appearing at the second electrode 12 varies depending upon the values of the capacitance components C1 and C2.

The alternating current signal B1 appearing at the second electrode 12 is detected by the detection circuit 18 and the control circuit 19 discriminates the kind of the optical recording medium 20 placed on the tray 41 based on the alternating current signal B1 detected by the detection circuit 18.

When the discrimination of the kind of the optical recording medium 20 using the first detecting section 31 has been completed, the driving mechanism is operated and the second detecting section 32 is moved downward until the second detecting section 32 comes into contact with the reverse surface of the optical recording medium 20.

As the second detecting section 32 is moved downward, the first detecting section 31 is moved downward and moved away from the light incidence plane of the optical recording medium 20.

When the second detecting section 32 comes into contact with the reverse surface of the optical recording medium 20, the driving mechanism is stopped, thereby keeping the second detecting section 32 at that position and an alternating current signal A generated by the alternating current signal generation circuit 17 is applied to the third electrode 13 under the control of the control circuit 19.

As a result, the alternating current signal A applied to the third electrode 13 is transmitted to the fourth electrode 14 via the circuit shown in FIG. 7(b) and therefore, an alternating current signal B2 appearing at the fourth electrode 14 varies depending upon the values of the capacitance components C3 and C4.

The alternating current signal B2 appearing at the fourth electrode 14 is detected by the detection circuit 18 and the control circuit 19 discriminates the kind of the optical recording medium 20 placed on the tray 41 based on the alternating current signal B2 detected by the detection circuit 18.

When the discrimination of the kind of the optical recording medium 20 using the second detecting section 32 has been completed, the driving mechanism is operated to move the first detecting section 31 and the second detecting section 32 upward and move the second detecting section 32 away from the reverse surface of the optical recording medium 20, and the driving mechanism is stopped so that the first detecting section 31 and the second detecting section 32 are located away from the optical recording medium 20.

According to this embodiment, since the first detecting section 31 and the second detecting section 32 are disposed on the opposite sides with respect to an optical recording medium 20 to be discriminated and are simultaneously driven by the common driving mechanism, it is possible reduce space required for mounting the apparatus 10 for discriminating an optical recording medium 20.

FIG. 9 is a schematic cross-sectional view showing a tray of a drive on which an apparatus for discriminating an optical recording medium that is another preferred embodiment of the present invention is mounted, wherein FIG. 9(a) shows the state where a tray is discharged from a main body and FIG. 9(b) shows the state where the tray is accommodated in the main body.

In this embodiment, when a tray 41 is discharged from the main body 40 of a drive, as shown in FIG. 9(a), a first detecting section 31 is moved to a position where it comes into contact with the light incidence plane of an optical recording medium 20 and on the other hand, when the tray 41 is mounted in the main body 40, as shown in FIG. 9(b), the first detecting section 31 is moved away from the light incidence plane of an optical recording medium 20.

Therefore, since the kind of an optical recording medium 20 can be discriminated after placing the optical recording medium 20 on the tray 41 and prior to accommodating the tray 41 in the main body 40 of the drive by mounting the apparatus 10 for discriminating an optical recording medium on the drive in this manner, the time required for recording data in or reproducing data from the optical recording medium 20 after it is placed on the tray 41 can be considerably shortened.

Figure 10:
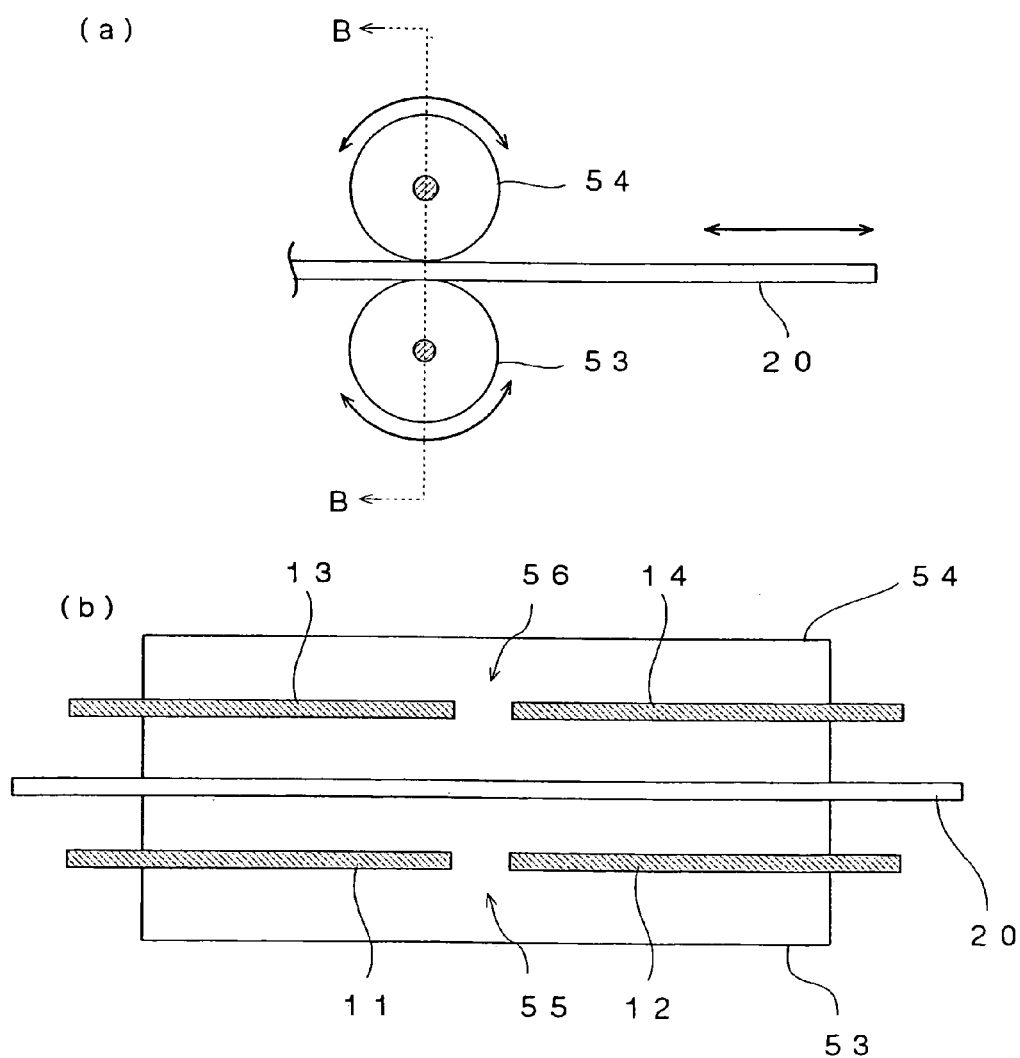

FIG. 10 is a schematic longitudinal cross-sectional view showing another example of a method for mounting an apparatus for discriminating an optical recording medium on a drive and FIG. 10(b) is a schematic cross-sectional view taken along a line B—B in FIG. 10(a).

In this embodiment, a first electrode 11 and a second electrode 12 are constituted by a shaft of one roller 53 of a slot-loading type drive and a third electrode 13 and a fourth electrode 14 are constituted by a shaft of the other roller 54 thereof.

Thus in this embodiment the one roller 53 constitutes a first detecting section 31 and the other roller 54 constitutes a second detecting section 32 so that, as shown in FIG. 10(b), the position of a gap 55 between the first electrode 11 and the second electrode 12 coincides with the position of a gap 56 between the third electrode 13 and the fourth electrode 14. Therefore, in the case where alternating current signals A are simultaneously applied to the first electrode 11 of the first detecting section 31 and the third electrode 13 of the second detecting section 32, an alternating current signal B1 appearing at the second electrode 12 is liable to be influenced by the alternating current signal A applied to the third electrode 13 and an alternating current signal B2 appearing at the fourth electrode 14 is liable to be influenced by the alternating current signal A applied to the first electrode 11.

Therefore, in this embodiment, the kind of an optical recording medium 20 is discriminated by applying an alternating current signal A to the first electrode 11 or the third electrode 13 and detecting an alternating current signal B1 appearing at the second electrode 12 or an alternating current signal B2 appearing at the fourth electrode 14 and then, the kind of an optical recording medium 20 is further discriminated by applying an alternating current signal A to the third electrode 13 or the first electrode 11 and detecting an alternating current signal B2 appearing at the fourth electrode 14 or an alternating current signal B1 appearing at the second electrode 12.

Figure 11:
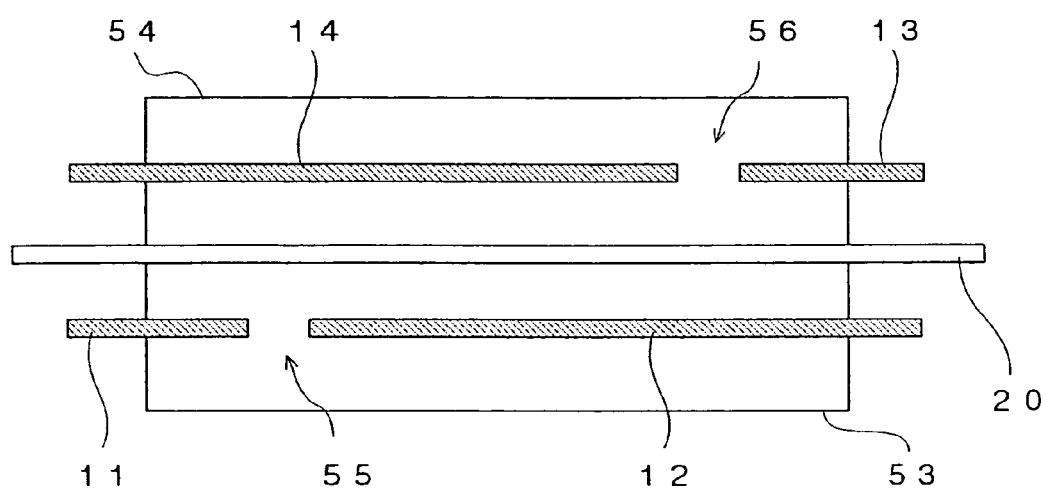
FIG. 11 is a schematic cross-sectional view taken along a line B—B in FIG. 10(a) and shows a further example of a method for mounting an apparatus for discriminating an optical recording medium on a drive.

FIG. 11 is a schematic cross-sectional view taken along a line B—B in FIG. 10(a) and shows a further example of a method for mounting an apparatus for discriminating an optical recording medium on a drive.

In this embodiment, a first electrode 11 and a second electrode 12 are constituted by a shaft of one roller 53 of a slot-loading type drive and a third electrode 13 and a fourth electrode 14 are constituted by a shaft of the other roller 54 thereof. However, as shown in FIG. 11, in this embodiment, the position of a gap 55 between the first electrode 11 and the second electrode 12 is offset from the position of a gap 56 between the third electrode 13 and the fourth electrode 14.

Therefore, even in the case where alternating current signals A are simultaneously applied to the first electrode 11 of the first detecting section 31 and the third electrode 13 of the second detecting section 32, there is no risk of an alternating current signal B1 appearing at the second electrode 12 being influenced by the alternating current signal A applied to the third electrode 13 and an alternating current signal B2 appearing at the fourth electrode 14 being influenced by the alternating current signal A applied to the first electrode 11. Therefore, in this embodiment, the kind of an optical recording medium 20 can be discriminated by simultaneously applying alternating signals A to the first electrode 11 of the first detecting section 31 and the third electrode 13 of the second detecting section 32 and detecting the alternating current signal B1 appearing at the second electrode 12 and the alternating current signal B2 appearing at the fourth electrode 14.

Figure 12:
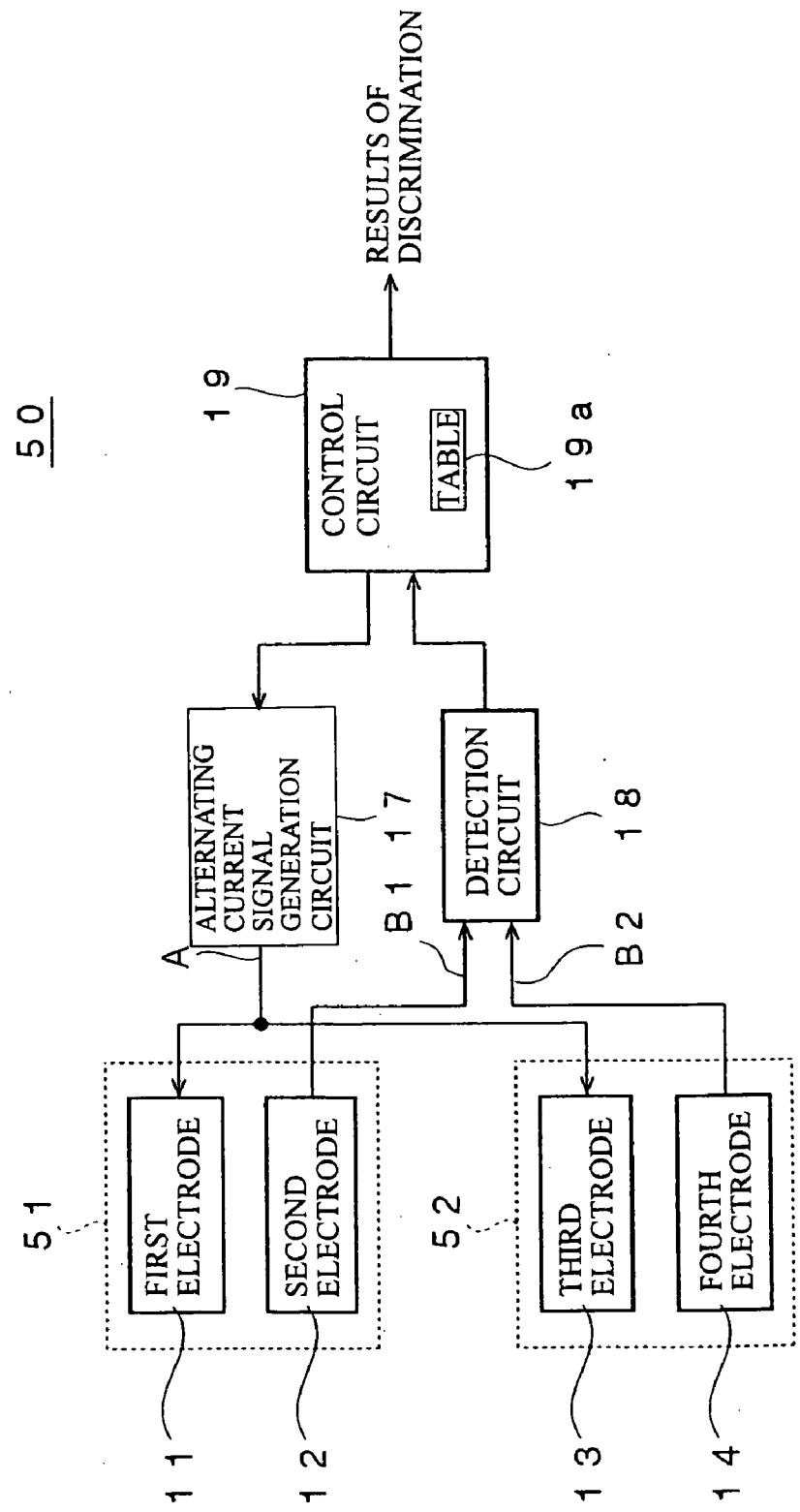
FIG. 12 is a block diagram showing an apparatus for discriminating an optical recording medium that is a further preferred embodiment of the present invention.

FIG. 12 is a block diagram showing an apparatus for discriminating an optical recording medium that is a further preferred embodiment of the present invention.

As shown in FIG. 12, the apparatus 50 for discriminating an optical recording medium according to this embodiment includes a first electrode 11, a second electrode 12, a third electrode 13, a fourth electrode 14, an alternating current signal generation circuit 17 for applying an alternating current signal A to the first electrode 11 and the third electrode 13, a detection circuit 18 for detecting the level of an alternating current signal B1 appearing at the second electrode 12 and the level of an alternating current signal B2 appearing at the fourth electrode 14, and a control circuit 19 for controlling the operations of the alternating current signal generation circuit 17 and the detection circuit 18, and a table 19a is provided in the control circuit 19.

As shown in FIG. 12, a first detecting section 51 is constituted by the first electrode 11 and the second electrode 12, and a second detection section 52 is constituted by the third electrode 13 and the fourth electrode 14.

Figure 13:
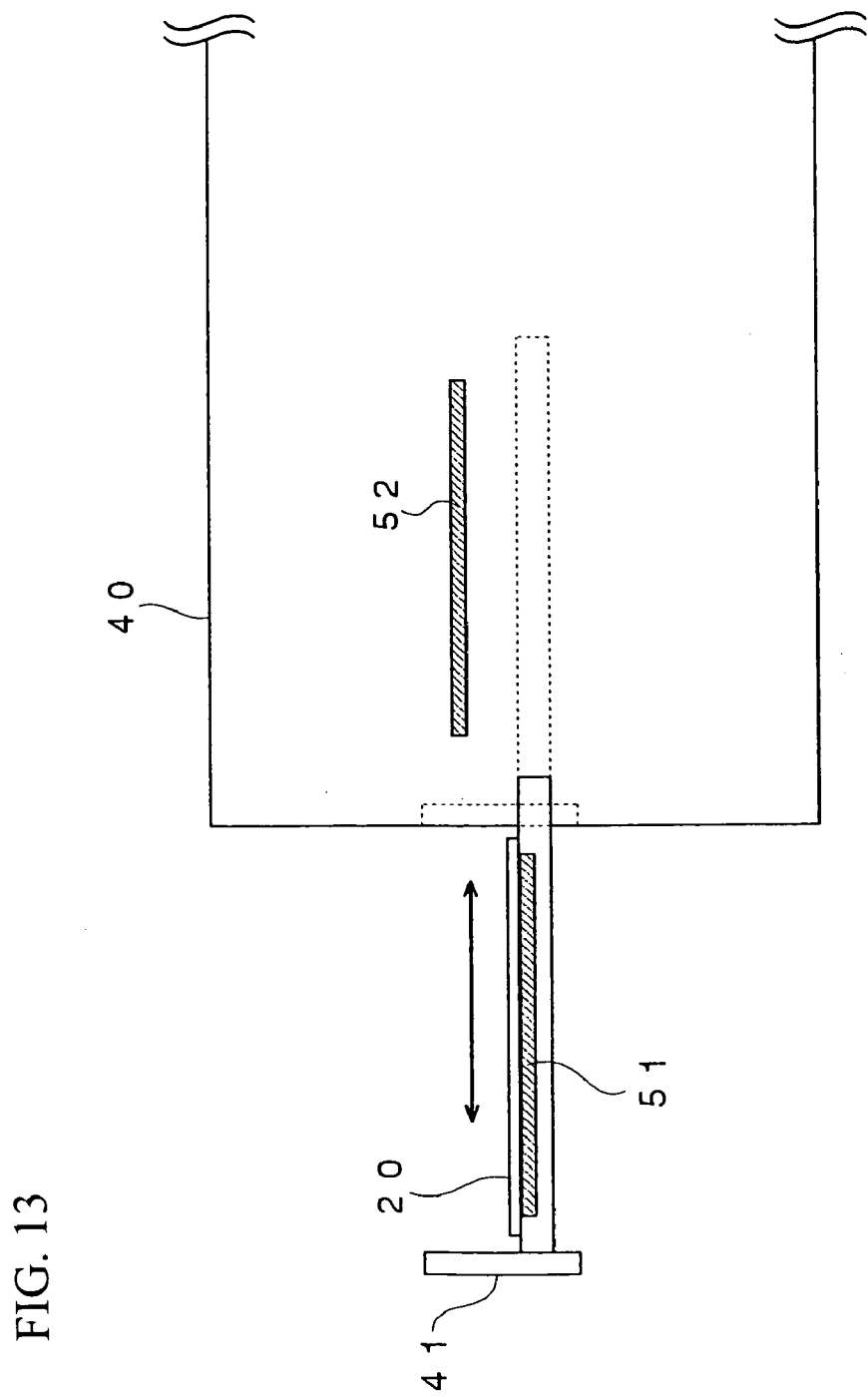
FIG. 13 is a schematic cross-sectional view showing a main body of a drive into which an apparatus for discriminating an optical recording medium shown in FIG. 12 is incorporated.

FIG. 13 is a schematic cross-sectional view showing a main body of a drive into which the apparatus 50 for discriminating an optical recording medium shown in FIG. 12 is incorporated.

As shown in FIG. 13, the first detecting section 51 constituted by the first electrode 11 and the second electrode 12 is mounted on a tray 41 and the second detecting section 52 constituted by the third electrode 13 and the fourth electrode 14 is mounted on the main body 40 of a drive.

As shown in FIG. 13, the second detecting section 52 is mounted on the main body 40 of the drive so as to cover an optical recording medium 20 when the tray 41 on which the optical recording medium 20 is placed is accommodated in the main body 40 of the drive.

Figure 14:
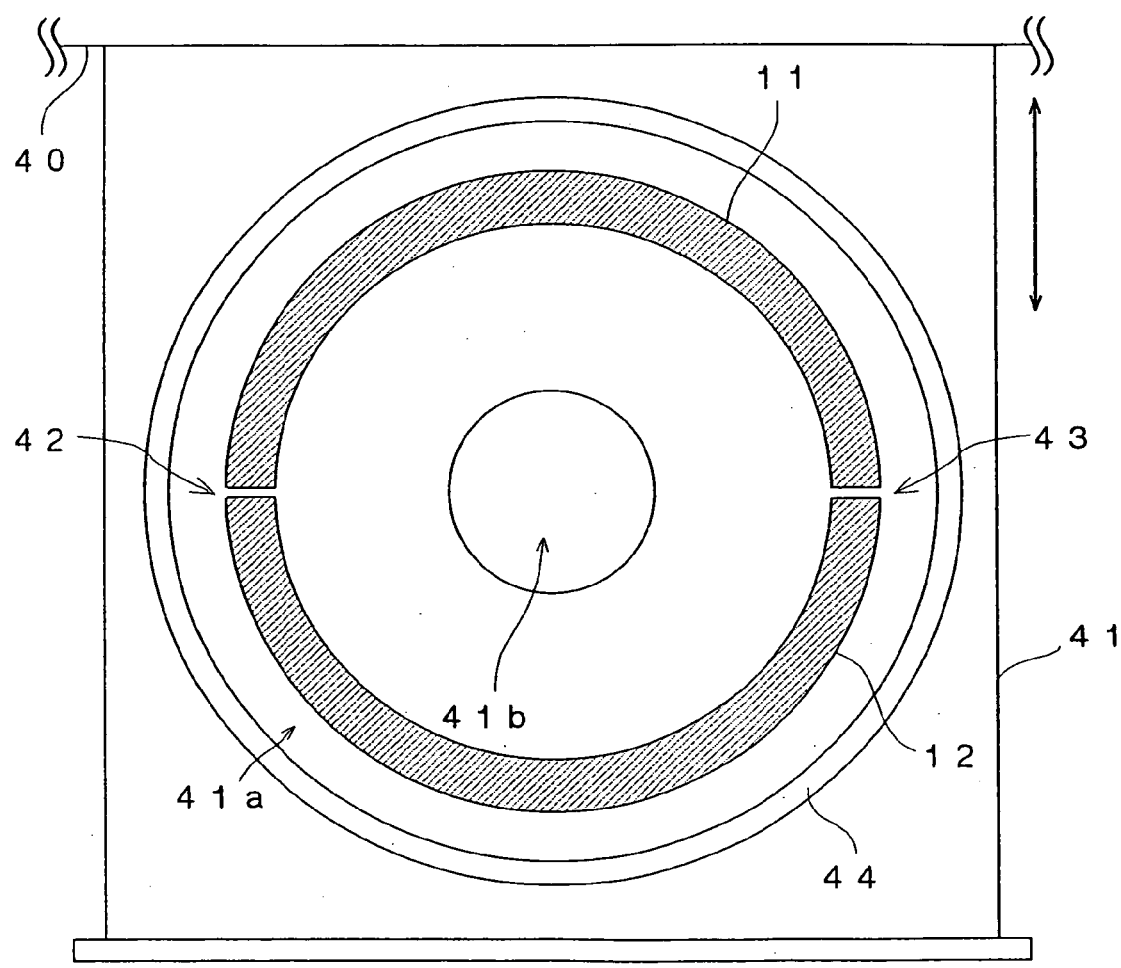
FIG. 14 is a schematic plan view showing a tray which can be accommodated in and discharged from a main body of a drive into which an apparatus for discriminating an optical recording medium that is a preferred embodiment of the present invention is incorporated.

FIG. 14 is a schematic plan view showing the tray which can be accommodated in and discharged from the main body of the drive into which an apparatus for discriminating an optical recording medium that is a preferred embodiment of the present invention is incorporated.

As shown in FIG. 14, the tray 41 which can be accommodated in and discharged from the main body 40 of the drive includes an optical recording medium setting section 41a on which an optical recording medium can be placed, and an opening 41b formed in a central portion of the optical recording medium setting section 41a and adapted for allowing a is spindle motor to chuck an optical recording medium when the tray 41 is accommodated in the main body 40 of the drive.

A shoulder portion 44 is provided on an outer circumferential portion of the optical recording medium setting section 41a so that an optical recording medium is held by the shoulder portion 44 when it is placed on the optical recording medium setting section 41a of the tray 41. Therefore, when an optical recording medium is placed on the optical recording medium setting section 41a of the tray 41, the recording surface of the optical recording medium is kept from being brought into direct contact with the tray 1, thereby preventing the recording surface of the optical recording medium from being damaged.

As shown in FIG. 14, a first electrode 11 and a second electrode 12 are formed annular-like on the optical recording medium setting section 41a in the vicinity of the shoulder portion 44. Each of the first electrode 11 and the second electrode 12 forms substantially a half of the annular portion and gaps 42 and 43 are formed between the first electrode 11 and the second electrode 12.

Figure 15:
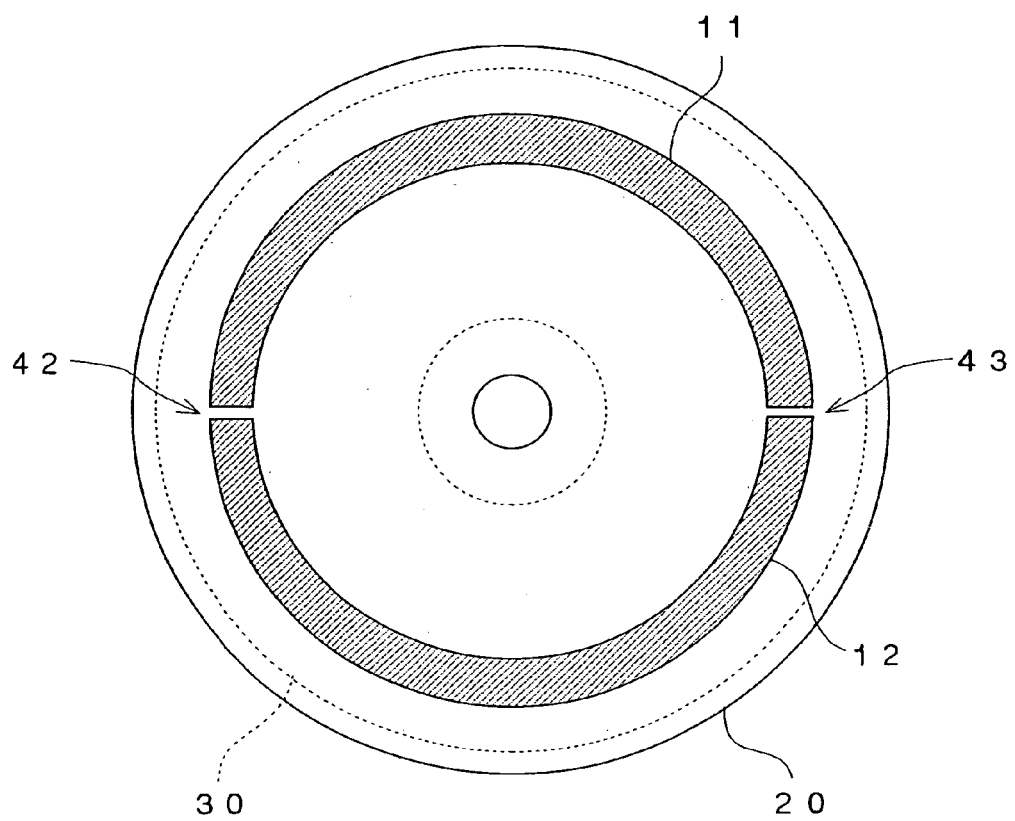
FIG. 15 is a schematic plan view showing a positional relationship between an optical recording medium and a first electrode and a second electrode when the optical recording medium is placed on a tray shown in FIG. 14.

FIG. 15 is a schematic plan view showing a positional relationship between an optical recording medium 20 and the first electrode 11 and the second electrode 12 when the optical recording medium 20 is placed on the tray 41 shown in FIG. 14.

As shown in FIG. 15, when an optical recording medium 20 is placed on the tray 41, the first electrode 11 and the second electrode 12 formed annular-like on the surface of the tray 41 are located inside of the outer circumference of the recording surface 30 of the optical recording medium 20 and along the outer circumference of the recording surface 30 of the optical recording medium 20.

Although not shown, each of the third electrode 13 and the fourth electrode 14 constituting the second detecting section 52 has a similar structure to that of each of the first electrode 11 and the second electrode 12 and is disposed in the main body 40 of the drive so that the surface thereof is directed downward and it faces an optical recording medium 20 placed on the tray 41 when the tray 41 is accommodated in the main body 40 of the drive.

The apparatus 50 for discriminating an optical recording medium shown in FIGS. 12 to 14 discriminates the kind of an optical recording medium 20 among the optical recording media having the aforesaid different structures as follows.

Figure 16:
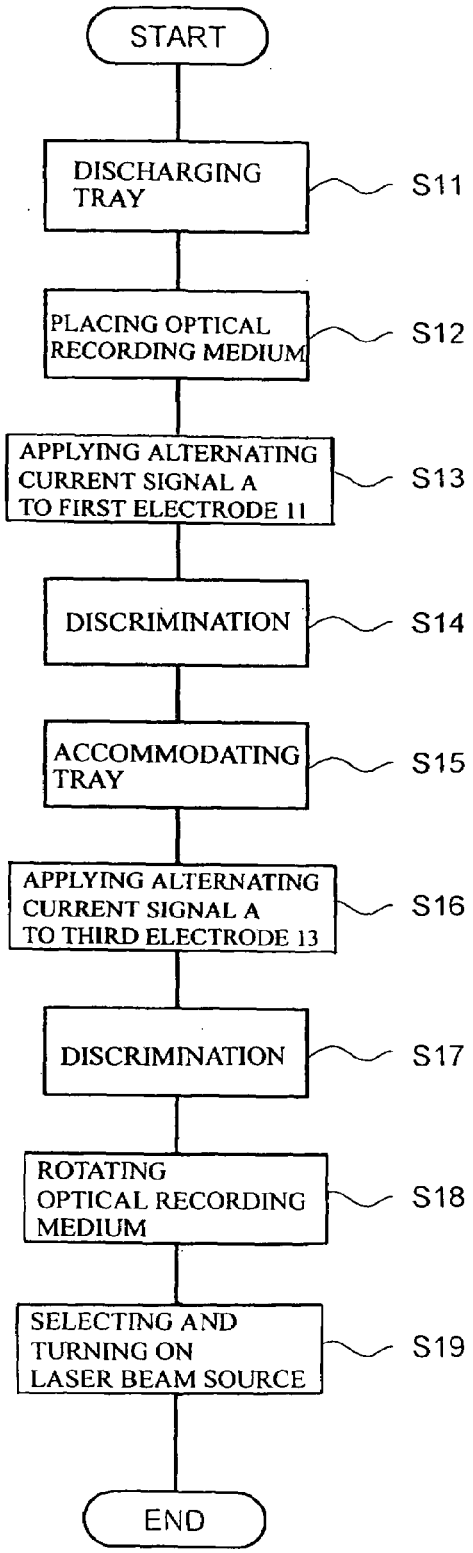
FIG. 16 a flow chart of a method for discriminating an optical recording medium using an apparatus for discriminating an optical recording medium shown in FIGS. 12 to 14.

FIG. 16 is a flow chart of a method for discriminating an optical recording medium using the apparatus 50 for discriminating an optical recording medium.

The tray 41 of the drive is discharged from the main body 40 of the drive (Step S11) and an optical recording medium 20 is placed on the optical recording medium setting section 41a of the tray 41 by the user (Step S11).

As a result, a circuit shown in FIG. 7(a) is formed between the first electrode 11 and the second electrode 12.

Then, an alternating current signal A generated by the alternating current signal generation circuit 17 is applied to the first electrode 11 under the control of the control circuit 19 while the optical recording medium 20 is present on the optical recording medium setting section 41a of the tray 41 (Step S13).

As a result, since the alternating current signal A applied to the first electrode 11 is transmitted to the second electrode 12 via the circuit shown in FIG. 7(a), an alternating current signal B1 appearing at the second electrode 12 varies depending upon the values of the capacitance components C1 and C2.

The alternating current signal B1 appearing at the second electrode 12 is detected by the detection circuit 18 and the control circuit 19 discriminates the kind of the optical recording medium 20 placed on the tray 41 based on the alternating current signal B1 detected by the detection circuit 18 (Step S14).

More specifically, in the case where the level of the alternating current signal B1 is equal to that obtained when the values of the capacitance components C1 and C2 are equal to Ca, the control circuit 19 discriminates that the optical recording medium 20 placed on the-tray 41 is a CD type optical recording medium 20a and in the case where the level of the alternating current signal B1 is equal to that obtained when the values of the capacitance components C1 and C2 are equal to Cb, the control circuit 19 discriminates that the optical recording medium 20 placed on the tray 41 is a DVD type optical recording medium 20b. On the other hand, in the case where the level of the alternating current signal B1 is equal to that obtained when the values of the capacitance components C1 and C2 are equal to Cc, the control circuit 19 discriminates that the optical recording medium 20 placed on the tray 41 is a next-generation type optical recording medium 20c.

In this embodiment, since the first electrode 11 and the second electrode 12 are annular-like formed on the optical recording medium setting section 41a of the tray 41 and are located inside of the outer circumference of the recording surface 30 of the optical recording medium 20 and along the outer circumference of the recording surface 30 of the optical recording medium 20 when an optical recording medium 20 is placed on the optical recording medium setting section 41a of the tray 41, even in the case where an optical recording medium 20 to be discriminated is warped and formed with periodical undulation in the circumferential direction thereof, the capacitance components C1 and C2 are substantially the same for the same kind of optical recording medium 20 irrespective of how the optical recording medium 20 is placed on the optical recording medium setting section 41a of the tray 41.

Therefore, if the range of the level of the alternating current signal B1 to be obtained is obtained in advance for each kind of the optical recording media 20 and stored as a table 19a in the control circuit 19, the kind of optical recording media 20 can be discriminated by referring to the table 19a in the control circuit 19.

While the kind of an optical recording medium 20 is being discriminated using the first detecting section 51, the tray 41 is accommodated in the main body 40 of the drive in accordance with user's instructions (Step S15).

When the optical recording medium 20 placed on the tray 41 has reached a position where it faces the third electrode 13 and the fourth electrode 14 provided on the lower side of the second detecting section 52, a circuit shown in FIG. 7(b) is formed between the third electrode 13 and the fourth electrode 14.

When the discrimination of the kind of the optical recording medium 20 using the first detecting section 51 has been completed, an alternating current signal A generated by the alternating current signal generation circuit 17 is applied to the third electrode 14 (Step S16).

As a result, the alternating current signal A applied to the third electrode 14 is transmitted to the fourth electrode 14 via the circuit shown in FIG. 7(b) and, therefore, an alternating current signal B2 appearing at the fourth electrode 14 varies depending upon the values of the capacitance components C3 and C4.

The alternating current signal B2 appearing at the fourth electrode 14 is detected by the detection circuit 18 and the control circuit 19 discriminates the kind of the optical recording medium 20 placed on the tray 41 based on the alternating current signal B2 detected by the detection circuit 18 (Step S17).

More specifically, in the case where the level of the alternating current signal B2 is equal to that obtained when the values of the capacitance components C3 and C4 are equal to Ca, the control circuit 19 discriminates that the optical recording medium 20 placed on the tray 41 is a CD type optical recording medium 20a and in the case where the level of the alternating current signal B2 is equal to that obtained when the values of the capacitance components C3 and C4 are equal to Cb, the control circuit 19 discriminates that the optical recording medium 20 placed on the tray 41 is a DVD type optical recording medium 20b. On the other hand, in the case where the level of the alternating current signal B2 is equal to that obtained when the values of the capacitance components C3 and C4 are equal to Cc, the control circuit 19 discriminates that the optical recording medium 20 placed on the tray 41 is a next-generation type optical recording medium 20c.

In this embodiment, since the third electrode 13 and the fourth electrode 14 are annular-like formed at positions where they face an optical recording medium 20 placed on the tray 41 accommodated in the main body 40 of the drive and are located inside of the outer circumference of the recording surface 30 of the optical recording medium 20 and along the outer circumference of the recording surface 30 of the optical recording medium 20 when the tray 41 is accommodated in the main body 40 of the drive, the capacitance components C3 and C4 are substantially the same for the same kind of optical recording medium 20 irrespective of how the optical recording medium 20 is placed on the optical recording medium setting section 41*a* of the tray 41 even in the case where an optical recording medium 20 to be discriminated is warped and formed with periodical undulation in the circumferential direction thereof.

Therefore, if the range of the level of the alternating current signal B2 to be obtained is obtained in advance for each kind of the optical recording media 20 and stored as a table 19*a* in the control circuit 19, the kind of optical recording media 20 can be discriminated by referring to the table 19*a* in the control circuit 19.

When the discrimination of the kind of the optical recording medium 20 has been completed, the optical recording medium 20 is rotated by a spindle motor (not shown) (Step S18) and a laser component and an optical system corresponding to the kind of the optical recording medium 20 discriminated at Step S6 are selected, thereby emitting a laser beam (Step S19).

Then, an initial setting operation and the like are effected similarly to in the conventional drive and data are recorded in the optical recording medium 20 or data are reproduced from the optical recording medium 20.

Therefore, if the apparatus 50 for discriminating an optical recording medium according to this embodiment is mounted on a drive, it is possible to immediately discriminate the kind of an optical recording medium 20 set in the drive prior to projecting a laser beam thereon.

According to this embodiment, since an optical recording medium 20 is discriminated using the first detecting section 51 from one side of the optical recording medium 20 and the optical recording medium 20 is discriminated using the second detecting section 52 from the other side of the optical recording medium 20, it is possible to more accurately discriminate the kind of an optical recording medium 20 than in the case where the kind of an optical recording medium 20 is discriminated from only one side of an optical recording medium 20.

Further, according to this embodiment, since the first electrode 11 and the second electrode 12 are annular-like formed on the optical recording medium setting section 41*a* of the tray 41 and are located inside of the outer circumference of the recording surface 30 of the optical recording medium 20 and along the outer circumference of the recording surface 30 of the optical recording medium 20 when an optical recording medium 20 is placed on the optical recording medium setting section 41*a* of the tray 41, the capacitance components C1 and C2 are substantially the same for the same kind of optical recording medium 20 irrespective of how the optical recording medium 20 is placed on the optical recording medium setting section 41*a* of the tray 41 even in the case where an optical recording medium 20 to be discriminated is formed with periodical undulation in the circumferential direction thereof. Therefore, it is possible to accurately discriminate the kind of an optical recording medium 20 using the first detecting section 51 even in the case where the optical recording medium 20 is formed with periodical undulation in the circumferential direction thereof.

Furthermore, according to this embodiment, since the third electrode 13 and the fourth electrode 14 are annular-like formed at positions where they face an optical recording medium 20 placed on the tray 41 accommodated in the main body 40 of the drive and are located inside of the outer circumference of the recording surface 30 of the optical recording medium 20 and along the outer circumference of the recording surface 30 of the optical recording medium 20 when the tray 41 is accommodated in the main body 40 of the drive, the capacitance components C3 and C4 are substantially the same for the same kind of optical recording medium 20 irrespective of how the optical recording medium 20 is placed on the optical recording medium setting section 41*a* of the tray 4 even in the case where an optical recording medium 20 to be discriminated is formed with periodical undulation in the circumferential direction thereof, 1. Therefore, it is possible to accurately discriminate the kind of an optical recording medium 20 using the second detecting section 52 even in the case where the optical recording medium 20 is formed with periodical undulation in the circumferential direction thereof.

Figure 17:
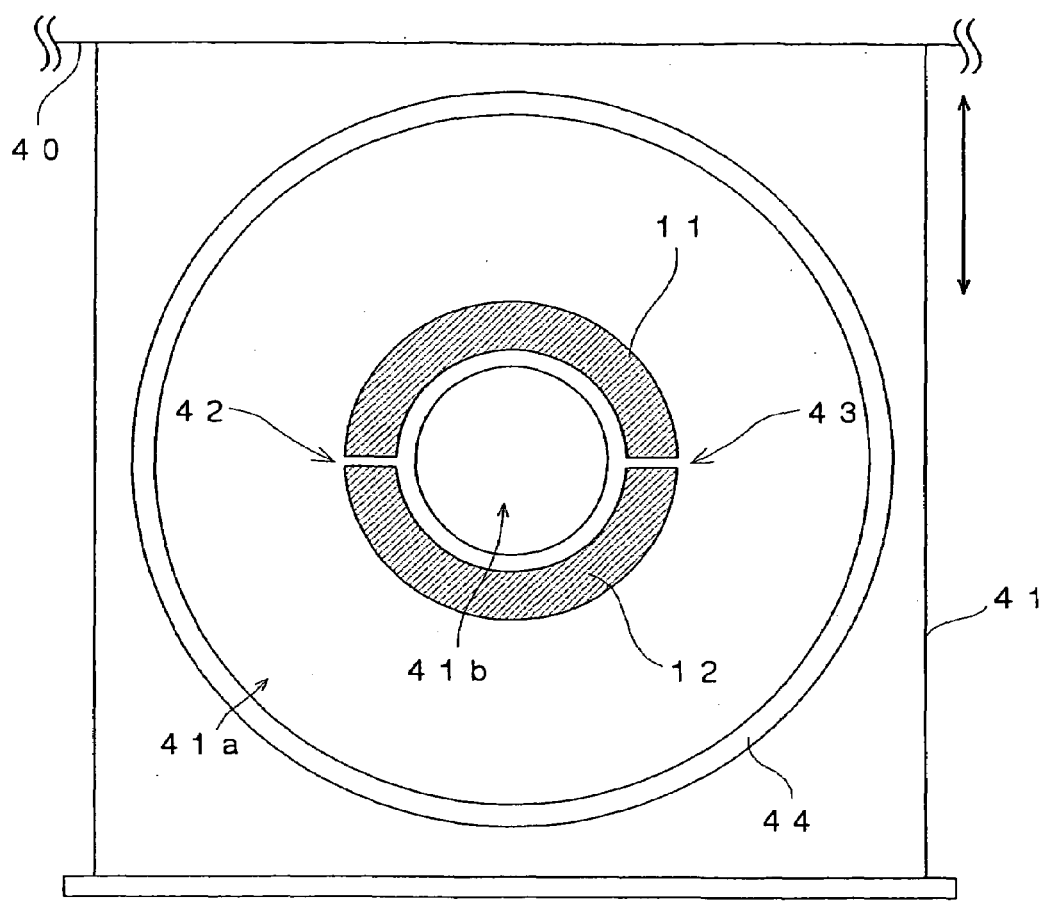
FIG. 17 is a schematic plan view showing a tray which can be accommodated in and discharged from a main body of a drive into which an apparatus for discriminating an optical recording medium that is a further preferred embodiment of the present invention is incorporated.

FIG. 17 is a schematic plan view showing a tray which can be accommodated in and discharged from a main body of a drive into which an apparatus for discriminating an optical recording medium that is a further preferred embodiment of the present invention is incorporated.

As shown in FIG. 17, the tray 41 which can be accommodated in and discharged from the main body 40 of the drive includes an optical recording medium setting section 41*a* on which an optical recording medium can be placed, and an opening 41*b* formed in a central portion of the optical recording medium setting section 41*a* and adapted for allowing a spindle motor to chuck an optical recording medium when the tray 41 is accommodated in the main body 40 of the drive.

As shown in FIG. 17, in this embodiment, a first electrode 11 and a second electrode 12 are formed annular-like on the optical recording medium setting section 41*a* in the vicinity of the opening 41*b*. Each of the first electrode 11 and the second electrode 12 forms substantially a half of the annular portion and gaps 42 and 43 are formed between the first electrode 11 and the second electrode 12.

Figure 18:
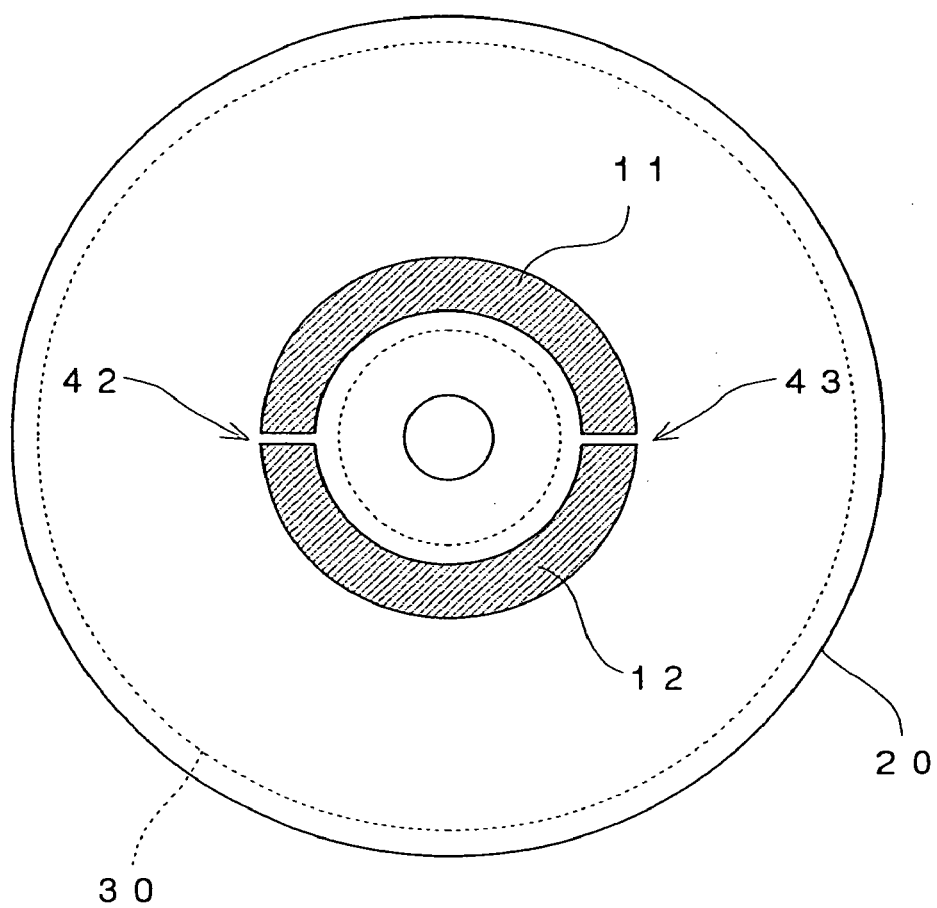
FIG. 18 is a schematic plan view showing a positional relationship between an optical recording medium and a first electrode and a second electrode when the optical recording medium is placed on a tray shown in FIG. 17.

FIG. 18 is a schematic plan view showing a positional relationship between an optical recording medium 20 and the first electrode 11 and the second electrode 12 when the optical recording medium 20 is placed on the tray 41 shown in FIG. 17.

As shown in FIG. 18, when an optical recording medium 20 is placed on the tray 41, the first electrode 11 and the second electrode 12 formed annular-like on the surface of the tray 41 are located inside of the outer circumference of the recording surface 30 of the optical recording medium 20 and along the outer circumference of the recording surface 30 of the optical recording medium 20.

Although not shown, each of the third electrode 13 and the fourth electrode 14 constituting the second detecting section 52 has a similar structure to that of each of the first electrode 11 and the second electrode 12 and is disposed in the main body 40 of the drive so that the surface thereof is directed downward and it faces an optical recording medium 20 placed on the tray 41 when the tray 41 is accommodated in the main body 40 of the drive.

In the apparatus for discriminating an optical recording medium according to this embodiment, similarly to in the apparatus for discriminating an optical recording medium shown in FIGS. 12 to 14, an optical recording medium 20 is to be discriminated is placed on the optical recording medium setting section 41a of the tray 41 and the kind of the optical recording medium 20 is discriminated using the first detecting section 51. Then, the tray 41 is accommodated in the main body 40 of the drive and the kind of the optical recording medium 20 is discriminated using the second detecting section 52.

In this embodiment, since the first electrode 11 and the second electrode 12 are annular-like formed on the optical recording medium setting section 41a of the tray 41 and are located inside of the outer circumference of the recording surface 30 of the optical recording medium 20 and along the outer circumference of the recording surface 30 of the optical recording medium 20 when an optical recording medium 20 is placed on the optical recording medium setting section 41a of the tray 41, the capacitance components C1 and C2 are substantially the same for the same kind of optical recording medium 20 irrespective of how the optical recording medium 20 is placed on the optical recording medium setting section 41a of the tray 41 even in the case where an optical recording medium 20 to be discriminated is warped and formed with periodical undulation in the circumferential direction thereof. Therefore, even in the case where an optical recording medium 20 is formed with periodical undulation in the circumferential direction thereof, it is possible to accurately discriminate the kind of an optical recording medium 20.

Further, in this embodiment, since the third electrode 13 and the fourth electrode 14 are annular-like formed at positions where they face an optical recording medium 20 placed on the tray 41 accommodated in the main body 40 of the drive and are located inside of the outer circumference of the recording surface 30 of the optical recording medium 20 and along the outer circumference of the recording surface 30 of the optical recording medium 20 when the tray 41 is accommodated in the main body 40 of the drive, the capacitance components C3 and C4 are substantially the same for the same kind of optical recording medium 20 irrespective of how the optical recording medium 20 is placed on the optical recording medium setting section 41a of the tray 41 even in the case where an optical recording medium 20 to be discriminated is formed with periodical undulation in the circumferential direction thereof. Therefore, it is possible to accurately discriminate the kind of an optical recording medium 20 using the second detecting section 52 even in the case where the optical recording medium 20 is formed with periodical undulation in the circumferential direction thereof.

Figure 19:
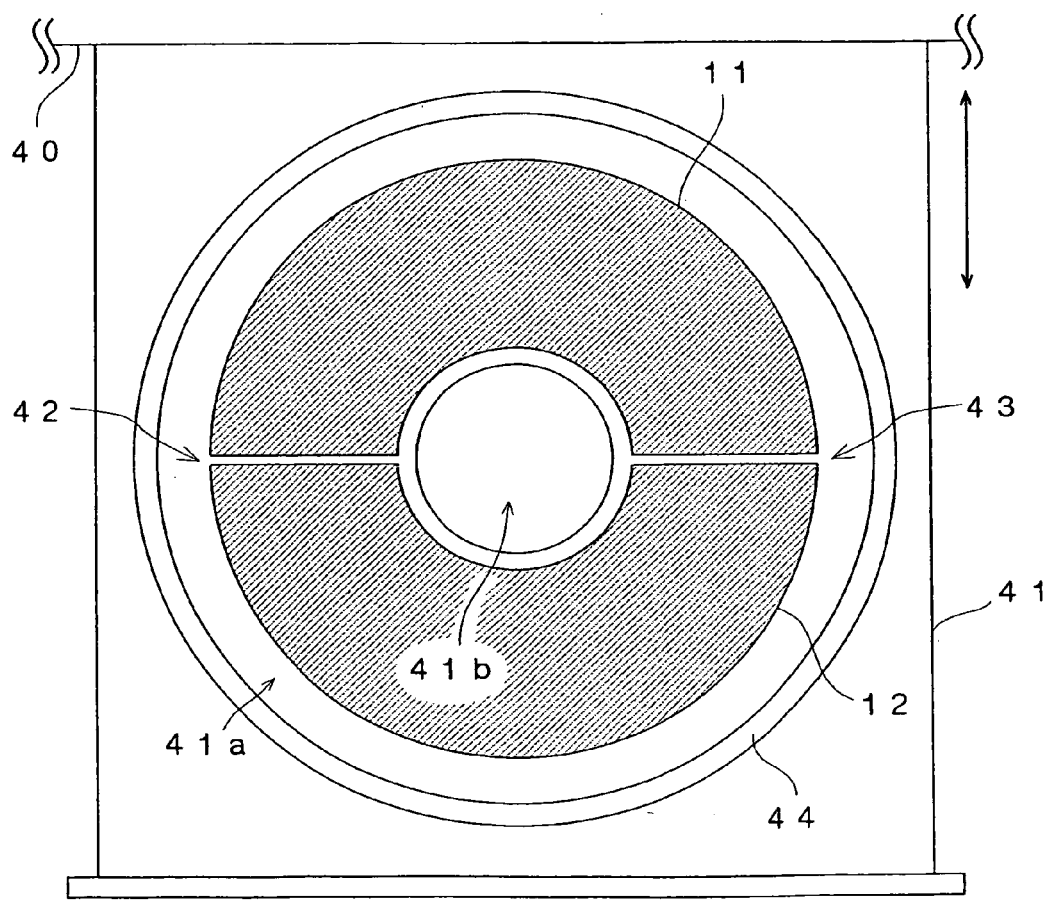
FIG. 19 is a schematic plan view showing a tray which can be accommodated in and discharged from a main body of a drive into which an apparatus for discriminating an optical recording medium that is a further preferred embodiment of the present invention is incorporated.

FIG. 19 is a schematic plan view showing a tray which can be accommodated in and discharged from a main body of a drive into which an apparatus for discriminating an optical recording medium that is a further preferred embodiment of the present invention is incorporated.

As shown in FIG. 19, the tray 41 which can be accommodated in and discharged from the main body 40 of the drive includes an optical recording medium setting section 41a on which an optical recording medium can be placed, and an opening 41b formed in a central portion of the optical recording medium setting section 41a and adapted for allowing a spindle motor to chuck an optical recording medium when the tray 41 is accommodated in the main body 40 of the drive.

As shown in FIG. 19, a first electrode 11 and a second electrode 12 are formed annular-like over substantially the entire surface of the optical recording medium setting section 41a of the tray 41. Each of the first electrode 11 and the second electrode 12 forms substantially a half of the annular portion and gaps 42 and 43 are formed between the first electrode 11 and the second electrode 12.

Figure 20:
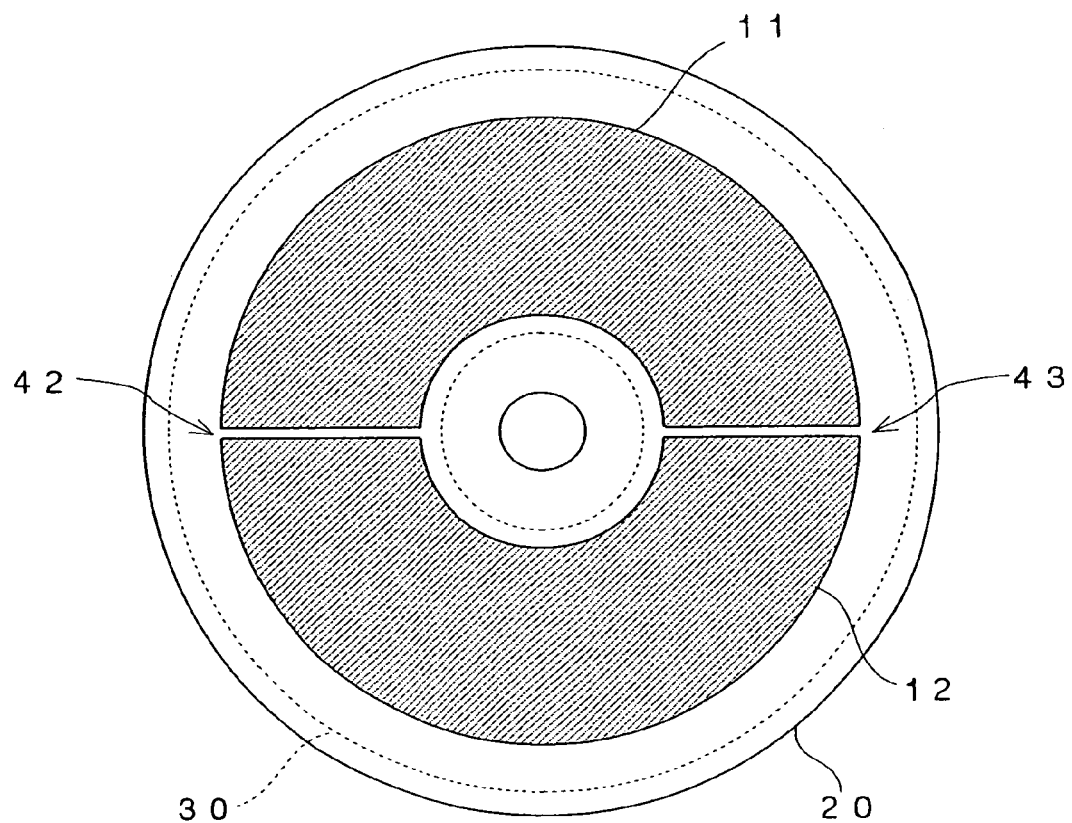
FIG. 20 is a schematic plan view showing a positional relationship between an optical recording medium and a first electrode and a second electrode when the optical recording medium is placed on a tray shown in FIG. 19.

FIG. 20 is a schematic plan view showing a positional relationship between an optical recording medium 20 and the first electrode 11 and the second electrode 12 when the optical recording medium 20 is placed on the tray 41 shown in FIG. 19.

As shown in FIG. 20, when an optical recording medium 20 is placed on the tray 41, the first electrode 11 and the second electrode 12 formed annular-like on the surface of the tray 41 are located so as to face substantially the entire surface of the recording surface 30 of the optical recording medium 20.

Although not shown, each of the third electrode 13 and the fourth electrode 14 constituting the second detecting section 52 has a similar structure to that of each of the first electrode 11 and the second electrode 12 and is disposed in the main body 40 of the drive so that the surface thereof is directed downward and it faces substantially the entire surface of the recording surface 30 of the optical recording medium 20.

In the apparatus for discriminating an optical recording medium according to this embodiment, similarly to in the apparatus for discriminating an optical recording medium shown in FIGS. 12 to 14, an optical recording medium 20 is to be discriminated is placed on the optical recording medium setting section 41a of the tray 41 and the kind of the optical recording medium 20 is discriminated using the first detecting section 51. Then, the tray 41 is accommodated in the main body 40 of the drive and the kind of the optical recording medium 20 is discriminated using the second detecting section 52.

In this embodiment, since the first electrode 11 and the second electrode 12 are annular-like formed over substantially the entire surface of the optical recording medium setting section 41a of the tray 41 and are located so as to face substantially the entire surface of the recording surface 30 of an optical recording medium 20 when an optical recording medium 20 is placed on the optical recording medium setting section 41a of the tray 41, the capacitance components C1 and C2 are substantially the same for the same kind of optical recording medium 20 irrespective of how the optical recording medium 20 is placed on the optical recording medium setting section 41a of the tray 41 even in the case where an optical recording medium 20 to be discriminated is warped and formed with periodical undulation in the circumferential direction thereof. Therefore, even in the case where an optical recording medium 20 is formed with periodical undulation in the circumferential direction thereof, it is possible to accurately discriminate the kind of an optical recording medium 20.

Further, in this embodiment, since the third electrode 13 and the fourth electrode 14 are annular-like formed at positions where they face an optical recording medium 20 placed on the tray 41 accommodated in the main body 40 of the drive and are located so as to face substantially the entire surface of the recording surface 30 of the optical recording medium 20 when the tray 41 is accommodated in the main body 40 of the drive, the capacitance components C3 and C4 are substantially the same for the same kind of optical recording medium 20 irrespective of how the optical recording medium 20 is placed on the optical recording medium setting section 41a of the tray 41 even in the case where an optical recording medium 20 to be discriminated is formed with periodical undulation in the circumferential direction thereof. Therefore, it is possible to accurately discriminate the kind of an optical recording medium 20 using the second detecting section 52 even in the case where the optical recording medium 20 is formed with periodical undulation in the circumferential direction thereof.

Furthermore, the larger the areas of the first electrode 11 and second electrode 12 and the third electrode 13 and fourth electrode 14 are, the more accurately can the kind of an optical recording medium 20 be discriminated even in the case where the optical recording medium 20 is formed with periodical undulation in the circumferential direction thereof. In this embodiment, since the first electrode 11 and the second electrode 12, the third electrode 13 and the fourth electrode 14 are formed so as to cover substantially the entire surface of the recording surface 30 of an optical recording medium 20, it is possible to accurately discriminate the kind of an optical recording medium 20.

Figure 21:
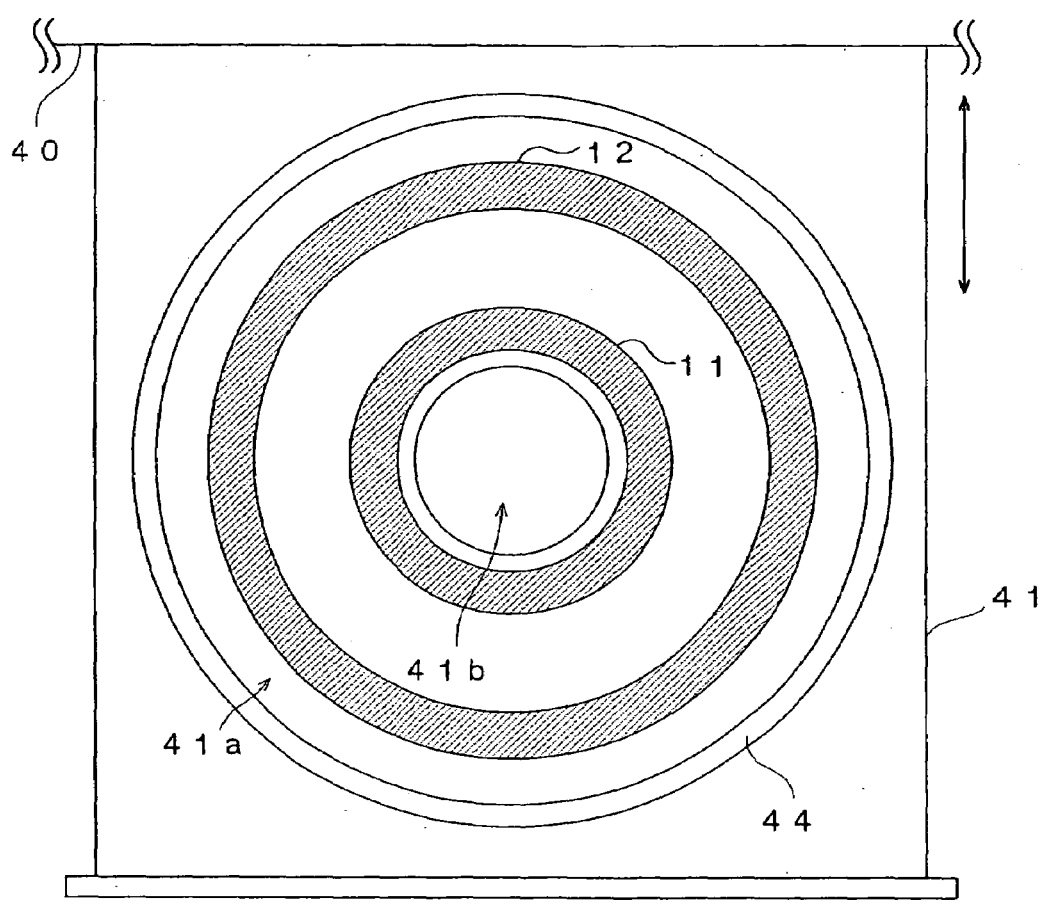
FIG. 21 is a schematic plan view showing a tray which can be accommodated in and discharged from a main body of a drive into which an apparatus for discriminating an optical recording medium that is a further preferred embodiment of the present invention is incorporated.

FIG. 21 is a schematic plan view showing a tray which can be accommodated in and discharged from a main body of a drive into which an apparatus for discriminating an optical recording medium that is a further preferred embodiment of the present invention is incorporated.

As shown in FIG. 21, the tray 41 which can be accommodated in and discharged from the main body 40 of the drive includes an optical recording medium setting section 41a on which an optical recording medium can be placed, and an opening 41b formed in a central portion of the optical recording medium setting section 41a and adapted for allowing a spindle motor to chuck an optical recording medium when the tray 41 is accommodated in the main body 40 of the drive.

As shown in FIG. 21, in this embodiment, a first electrode 11 is annular-like formed on the optical recording medium setting section 41a in the vicinity of the opening 41b and a second electrode 12 is annular-like formed on the optical recording medium setting section 41a in the vicinity of a shoulder portion 44.

Figure 22:
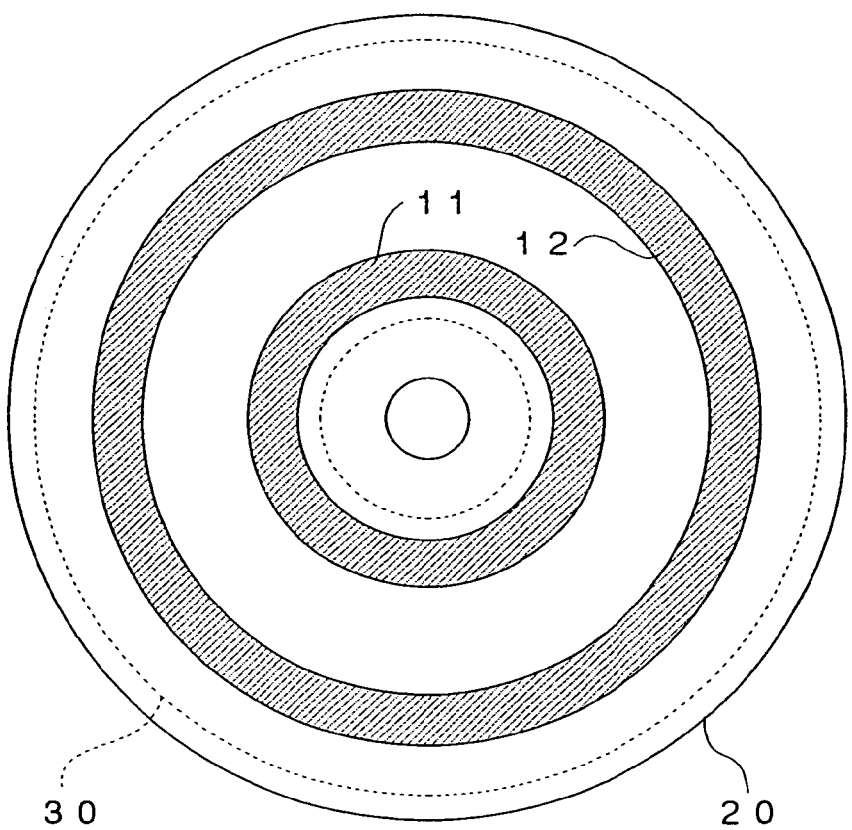
FIG. 22 is a schematic plan view showing a positional relationship between an optical recording medium and a first electrode and a second electrode when the optical recording medium is placed on a tray shown in FIG. 21.

FIG. 22 is a schematic plan view showing a positional relationship between an optical recording medium 20 and the first electrode 11 and the second electrode 12 when the optical recording medium 20 is placed on the tray 41 shown in FIG. 21.

As shown in FIG. 22, when an optical recording medium 20 is placed on the tray 41, the first electrode 11 formed annular-like on the surface of the tray 41 is located outside of the inner circumference of the recording surface 30 of the optical recording medium 20 and along the inner circumference of the recording surface 30 of the optical recording medium 20 and the second electrode 12 formed annular-like on the surface of the tray 41 is located inside of the outer circumference of the recording surface 30 of the optical recording medium 20 and along the outer circumference of the recording surface 30 of the optical recording medium 20.

Although not shown, the third electrode 13 and the fourth electrode 14 constituting the second detecting section 52 are constituted so as to form two concentric annular portions similarly to the first electrode 11 and the second electrode 12 and are disposed in the main body 40 of the drive so that the surfaces thereof are directed downward and they face an optical recording medium 20 placed on the tray 41 when the tray 41 is accommodated in the main body 40 of the drive.

In the apparatus for discriminating an optical recording medium according to this embodiment, similarly to in the apparatus for discriminating an optical recording medium shown in FIGS. 12 to 14, an optical recording medium 20 is to be discriminated is placed on the optical recording medium setting section 41a of the tray 41 and the kind of the optical recording medium 20 is discriminated using the first detecting section 51. Then, the tray 41 is accommodated in the main body 40 of the drive and the kind of the optical recording medium 20 is discriminated using the second detecting section 52.

In this embodiment, the first electrode 11 is annular-like formed on the optical recording medium setting section 41a in the vicinity of the opening 41b and the second electrode 12 is annular-like formed on the optical recording medium setting section 41a in the vicinity of the shoulder portion 44 so that when an optical recording medium 20 is placed on the tray 41, the first electrode 11 formed annular-like on the surface of the tray 41 is located outside of the inner circumference of the recording surface 30 of the optical recording medium 20 and along the inner circumference of the recording surface 30 of the optical recording medium 20 and the second electrode 12 formed annular-like on the surface of the tray 41 is located inside of the outer circumference of the recording surface 30 of the optical recording medium 20 and along the outer circumference of the recording surface 30 of the optical recording medium 20. Therefore, even in the case where an optical recording medium 20 to be discriminated is warped and formed with periodical undulation in the circumferential direction thereof, the capacitance components C1 and C2 are substantially the same for the same kind of optical recording medium 20 irrespective of how the optical recording medium 20 is placed on the optical recording medium setting section 41a of the tray 41. Accordingly, even in the case where an optical recording medium 20 is formed with periodical undulation in the circumferential direction thereof, it is possible to accurately discriminate the kind of an optical recording medium 20.

Further, in this embodiment, the third electrode 13 and the fourth electrode 14 are disposed so as to face an optical recording medium 20 placed on the tray 41 accommodated in the main body 40 of the drive and to form two concentric annular portions in such a manner that when an optical recording medium 20 is placed on the tray 41, the third electrode 13 is located outside of the inner circumference of the recording surface 30 of the optical recording medium 20 and along the inner circumference of the recording surface 30 of the optical recording medium 20 and the second electrode 12 is located inside of the outer circumference of the recording surface 30 of the optical recording medium 20 and along the outer circumference of the recording surface 30 of the optical recording medium 20. Accordingly, even in the case where an optical recording medium 20 to be discriminated is formed with periodical undulation in the circumferential direction thereof, the capacitance components C3 and C4 are substantially the same for the same kind of optical recording medium 20 irrespective of how the optical recording medium 20 is placed on the optical recording medium setting section 41a of the tray 41. Therefore, it is possible to accurately discriminate the kind of an optical recording medium 20 using the second detecting section 52 even in the case the optical recording medium 20 is formed with periodical undulation in the circumferential direction thereof.

Figure 23:
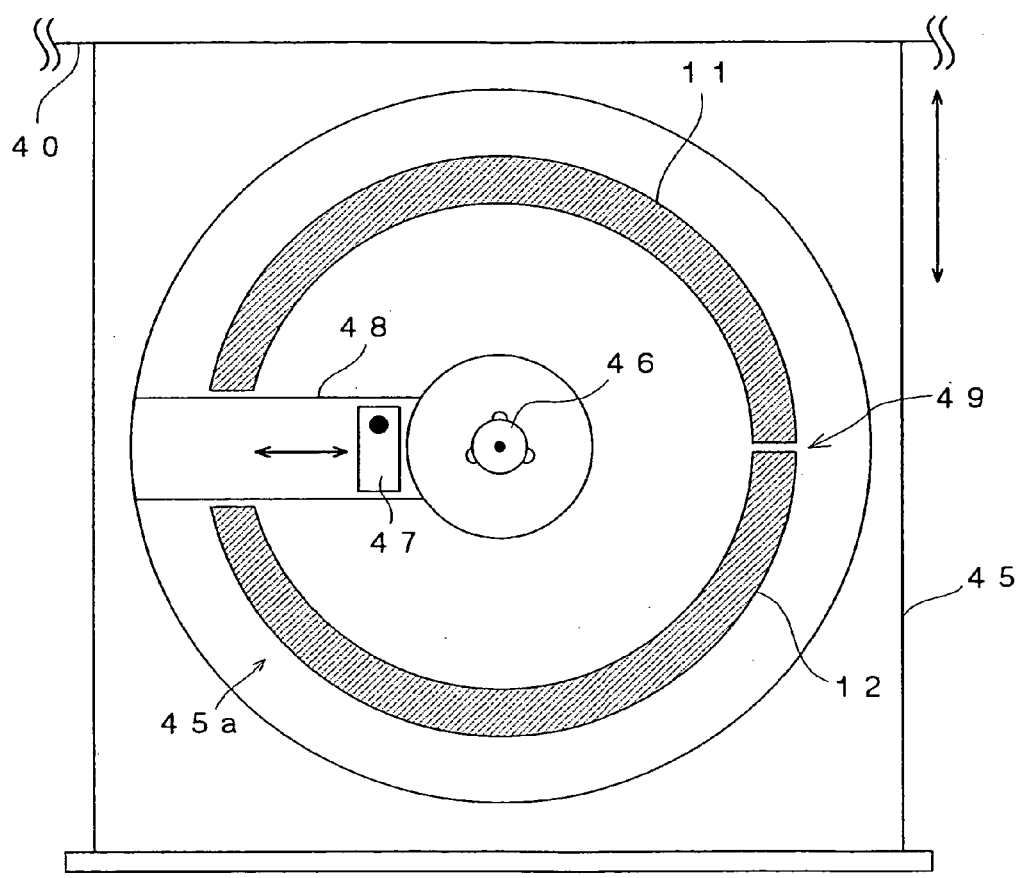
FIG. 23 is a schematic plan view showing a tray which can be accommodated in and discharged from a main body of a drive into which an apparatus for discriminating an optical recording medium that is a further preferred embodiment of the present invention is incorporated and on which a spindle motor is mounted.

FIG. 23 is a schematic plan view showing a tray which can be accommodated in and discharged from a main body of a drive into which an apparatus for discriminating an optical recording medium that is a further preferred embodiment of the present invention is incorporated and on which a spindle motor is mounted.

As shown in FIG. 23, in this embodiment, the tray 45 is constituted in such a manner that the user causes a spindle motor 46 to directly chuck an optical recording medium 20. Trays constituted in the manner of the tray 45 are widely used in note-type personal computers.

As shown in FIG. 23, an optical system 47 for emitting a laser beam is housed in the tray 45 and the tray 45 is formed with an optical system movable region 48 so that the optical system 47 can be moved in a radial direction of an optical recording medium 20 when data are recorded in the optical recording medium 20 chucked by the spindle motor 46 or when data are reproduced from an optical recording medium 20.

As shown in FIG. 23, in this embodiment, a first electrode 11 and a second electrode 12 are annular-like formed along the outer circumference of an optical recording medium setting section 45a of the tray 45. Each of the first electrode 11 and the second electrode 12 forms substantially a half of the annular portion and the optical system movable region 48 and a gap 49 is formed between the first electrode 11 and the second electrode 12.

In this embodiment, when an optical recording medium 20 is placed on the tray 45, the first electrode 11 and the second electrode 12 annular-like formed on the surface of the tray 45 are located along the outer circumference of the recording surface 30 of the optical recording medium 20.

In this embodiment, the first electrode 11 and the second electrode 12 are annular-like disposed along the outer circumference of an optical recording medium setting section 45a of the tray 45 and when an optical recording medium 20 is placed on the tray 45, the first electrode 11 and the second electrode 12 annular-like formed on the surface of the tray 45 are located along the outer circumference of the recording surface 30 of the optical recording medium 20. Therefore, even in the case where an optical recording medium 20 to be discriminated is warped and formed with periodical undulation in the circumferential direction thereof, the capacitance components C1 and C2 are substantially the same for the same kind of optical recording medium 20 irrespective of how the optical recording medium 20 is placed on the optical recording medium setting section 45a of the tray 45. Hence, even in the case where an optical recording medium 20 is formed with periodical undulation in the circumferential direction thereof, it is possible to accurately discriminate the kind of an optical recording medium 20.

Figure 24:
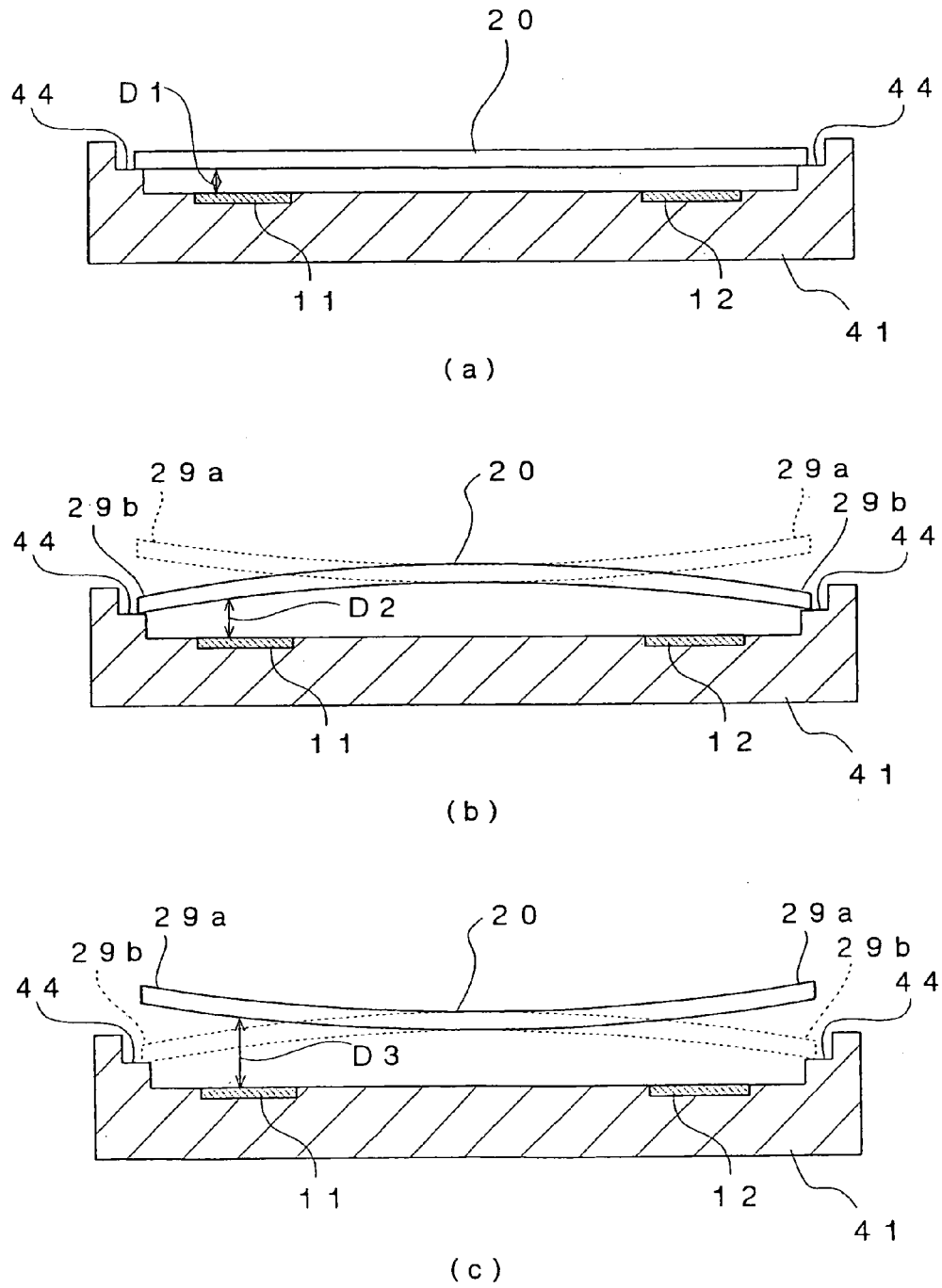
Figure 27:
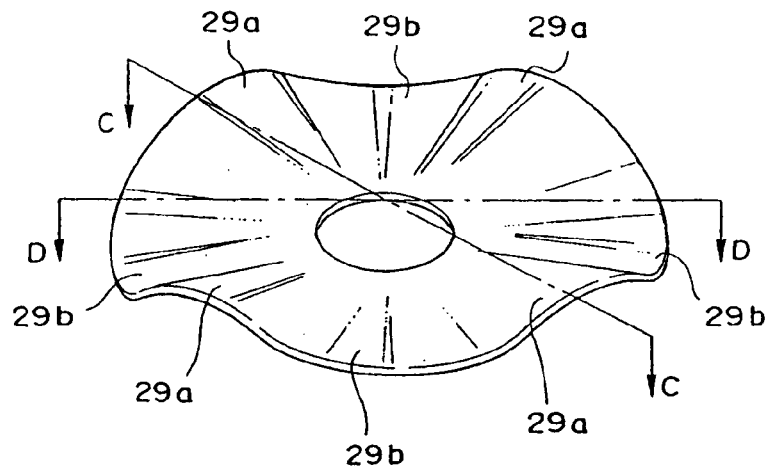
FIG. 27 is a schematic perspective view showing an optical recording medium formed with periodical undulation in the circumferential direction thereof.
Figure 28:
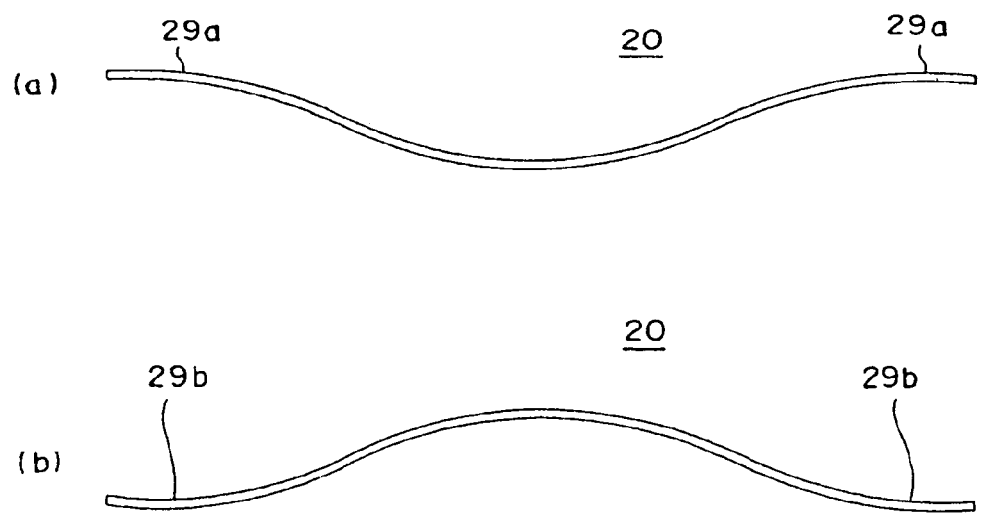
FIG. 28(a) is a schematic cross-sectional view taken along a line C—C in FIG. 27
FIG. 28(b) is a schematic cross-sectional view taken along a line D—D in FIG. 27.

FIG. 24 is a schematic cross-sectional view showing the state where an optical recording medium is placed on a tray, wherein FIG. 24 (a) shows the case where an optical recording medium formed with no periodical undulation in the circumferential direction thereof is placed on the tray and FIGS. 24(b) and(c) shows the cases where an optical recording medium formed with a periodical undulation in the circumferential direction thereof is placed on the tray.

As shown in FIG. 24(a), when an optical recording medium formed with no periodical undulation in the circumferential direction thereof is placed on a tray 41, the distances D1 between a first electrode 11 and a second electrode 12 and the surface of the optical recording medium 20 are constant.

To the contrary, as shown in each of FIG. 24(b) and FIG. 24(c), when an optical recording medium 20 formed with periodical undulation in the circumferential direction thereof is placed on the tray 41, the distances between a first electrode 11 and a second electrode 12 and the surface of the optical recording medium 20 vary between the minimum distance D2 and the maximum distance D3 depending upon the position in the circumference direction of the optical recording medium 20 and as periodical undulation in the circumferential direction the optical recording medium 20 becomes large, the difference ΔD between the maximum distance D3 and the minimum distance D2 becomes large.

Therefore, it is preferable to set the value the distance D1 to be equal to the height of a shoulder portion 44 and determine areas and positions of the first electrode 11 and the second electrode 12 in relation to the minimum distance D2, the maximum distance D3 and the difference ΔD between the maximum distance D3 and the minimum distance D2 when each kind of an optical recording medium 20 is formed with the maximum undulation allowed by the standard so that the kind of an optical recording medium 20 can be accurately discriminated even in the case where each kind of an optical recording medium is formed with the maximum undulation allowed by the standard.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although optical recording media in which focus distances are different from each other are discriminated, the present invention can be applied to the case where a plurality kinds of optical recording media for which a common recording and reproducing system is used, for example, a DVD in which data are to be recorded in one layer on one side and a DVD in which data are to be recorded in two layers on one side, are discriminated.

Further, in the embodiments shown in FIGS. 3 and 8, although the first detecting section 31 and the second detecting section 32 are provided in the main body 40 of the drive, it is not absolutely necessary to provide the first detecting section 31 and the second detecting section 32 in the main body 40 of the drive and one of them may be provide on the tray 41.

Furthermore, in the embodiments shown in FIGS. 3, 8 and 9, although the alternating current signal A is applied to the first electrode 11 and the third electrode 13 while the first detecting section 31 and the second detecting section 32 are in contact with the light incidence plane of an optical recording medium 20, thereby discriminating the kind of an optical recording medium 20, it is not absolutely necessary to apply the alternating current signal A is applied to the first electrode 11 and the third electrode 13 while the first detecting section 31 and the second detecting section 32 are in contact with the light incidence plane of an optical recording medium 20 and to discriminate the kind of an optical recording medium 20 and it is possible to apply an alternating current signal A to the first electrode 11 and the third electrode 13 while the first detecting section 31 and the second detecting section 32 are located close to the light incidence plane of an optical recording medium 20 and to discriminate the kind of an optical recording medium 20. In such a case, since the discrimination accuracy of an optical recording medium 20 is affected by the warpage and periodical circumferential undulation of an optical recording medium 20, it is preferable to constitute a first electrode 11 and a second electrode 12, and a third electrode 13 and a fourth electrode 14 so as to have structures shown in FIGS. 14, 17, 19 and 21.

Moreover, in the embodiment shown in FIG. 21, although the first electrode 11 is annular-like formed on the optical recording medium setting section 41a in the vicinity of the opening 41b and the second electrode 12 is annular-like formed on the optical recording medium setting section 41a in the vicinity of a shoulder portion 44, it is possible to annular-like form the second electrode 12 on the optical recording medium setting section 41a in the vicinity of the opening 41b and annular-like form the first electrode 11 on the optical recording medium setting section 41a in the vicinity of a shoulder portion 44.

Further, in the embodiment shown in FIG. 21, although the first electrode 11 and the second electrode 12 are disposed to be spaced from each other in a radial direction of the optical recording medium and over substantially 360 degrees around the center of the tray 41, it is not absolutely necessary to dispose the first electrode 11 and the second electrode 12 over substantially 360 degrees around the center of the tray 41 and it is sufficient for the first electrode 11 and the second electrode 12 to be disposed over substantially 180 degrees around the center of the tray 41. Preferably, the first electrode 11 and the second electrode 12 are disposed over an angle equal to or larger than substantially 270 degrees around the center of the tray 41.

Furthermore, in the embodiment shown in FIG. 23, although the first electrode 11 and the second electrode 12 are annular-like formed along the outer circumference of the optical recording medium setting section 45a of the tray 45, it is possible to form the first electrode 11 and the second electrode 12 in the vicinity of and along the inner circumference of the optical recording medium setting section 45a of the tray 45 or to form the first electrode 11 and the second electrode 12 over substantially the entire surface of the optical recording medium setting section 45a of the tray 45. Further, it is possible to provide the first electrode 11 and the second electrode 12 on the tray 41 at a portion corresponding to the vicinity of the inner circumference of the recording surface 30 of an optical recording medium 20 or to form the second electrode 12 and the first electrode 11 on the tray 41 at a portion corresponding to the vicinity of the outer circumference of the recording surface 30 of an optical recording medium 20. In the case where the first electrode 11 and the second electrode 12 are provided on a tray 45 widely used for note-type personal computers or the like, if space required for disposing the first electrode 11 and the second electrode 12 is restricted, it is preferable to provide the first electrode 11 and the second electrode 12 in the vicinity of and along the inner circumference of the optical recording medium setting section 45a of the tray 45.

Moreover, in the embodiments shown in FIGS. 14, 17 and 19, although the first electrode 11 and the second electrode 12 are formed over substantially 180 degrees around the center of the tray 41, it is not absolutely necessary to form the first electrode 11 and the second electrode 12 over substantially 180 degrees around the center of the tray 41 and the first electrode 11 and the second electrode 12 may be formed at symmetrical positions with respect to a straight line passing through the center of the tray 41 so that each of them is formed over an angle equal to or larger than 90 degrees.

Further, in the embodiments shown in FIGS. 14, 17, 19, 21 and 23, although each of the first electrode 11 and the second electrode 12 is annular-like formed on the tray 41, 45, it is not absolutely necessary to accurately annular-like form each of the first electrode 11 and the second electrode 12 and it is sufficient for each of the first electrode 11 and the second electrode 12 to be formed substantially annular-like.

Furthermore, in the embodiments shown in FIGS. 14, 17, 19 and 21, although the third electrode 13 and the fourth electrode 14 provided in the main body 40 of the drive have similar structures to those of the first electrode 11 and the second electrode 1–2 provided on the tray 41, it is not absolutely necessary for the third electrode 13 and the fourth electrode 14 to have similar structures to those of the first electrode 11 and the second electrode 12 and it is possible to provide the third electrode 13 and the fourth electrode 14 so as to have the structures shown in FIGS. 14, 17 and 21 while the first electrode 11 and the second electrode 12 have the structures shown in FIG. 14, for example.

Moreover, in the above described embodiments, although the kind of an optical recording medium 20 is discriminated by employing the first electrode 11 and the second electrode 12 and detecting the alternating current signal B1 appearing at the second electrode 12 when the alternating current signal A is applied to the first electrode 11, and the kind of an optical recording medium 20 is separately discriminated by employing the third electrode 13 and the fourth electrode 14 and detecting the alternating current signal B2 appearing at the fourth electrode 14 when the alternating current signal A is applied to the third electrode 13, it is possible to discriminate the kind of an optical recording medium 20 by employing a planar-coil like electrode and detecting an eddy current generated by supplying an electrical current to the planar-coil like electrode.

According to the present invention, it is possible to provide an apparatus for discriminating an optical recording medium and a method for discriminating an optical recording medium which can reliably discriminate the kind of an optical recording medium.

Further, according to the present invention, it is possible to provide an apparatus for discriminating an optical recording medium and a method for discriminating an optical recording medium which can reliably discriminate the kind of an optical recording medium even in the case where the optical recording medium to be discriminated is warped and formed with periodical undulation in the circumferential direction thereof.

Furthermore, according to the present invention, it is possible to provide an apparatus for discriminating an optical recording medium and a method for discriminating an optical recording medium constituted so as to be irradiated with a laser beam from a side opposite to a substrate, which can reliably discriminate the kind of an optical recording medium.

The invention claimed is:

1. An apparatus for discriminating an optical recording medium comprising at least a first dielectric layer, a second dielectric layer and a conductive layer formed between the first dielectric layer and the second dielectric layer, the apparatus for discriminating an optical recording medium comprising a first detecting section provided with an electrode and disposable in the vicinity of a surface of the first dielectric layer, a second detecting section provided with an electrode and disposable in the vicinity of a surface of the second dielectric layer and a signal applying means for applying a signal for detection to the electrode of the first detecting section and the electrode of the second detecting section.

2. An apparatus for discriminating an optical recording medium in accordance with claim 1, which further comprises a driving means for moving the first detection section to a position in the vicinity of the surface of the first dielectric layer and away from the surface of the first dielectric layer and moving the second detection section to a position in the vicinity of the surface of the second dielectric layer and away from the surface of the second dielectric layer, the driving means being constituted so as to locate the first detecting section and the second detecting section at positions in the vicinity of the surfaces of the first dielectric layer and the second dielectric layer where the first detecting section and the second detecting section do not face each other.

3. An apparatus for discriminating an optical recording medium in accordance with claim 2, wherein the driving means is constituted so as to simultaneously locate the first detecting section and the second detecting section at positions in the vicinity of the surfaces of the first dielectric layer and the second dielectric layer and the signal applying means is constituted so as to simultaneously apply signals for detection to the electrode of the first detecting section and the electrode of the second detecting section.

4. An apparatus for discriminating an optical recording medium in accordance with claim 2, wherein the driving means includes a first driving means for moving the first detection section to a position in the vicinity of the surface of the first dielectric layer and away from the surface of the first dielectric layer and a second driving means for moving the second detection section to a position in the vicinity of the surface of the second dielectric layer and away from the surface of the second dielectric layer.

5. An apparatus for discriminating an optical recording medium in accordance with claim 1, which further comprises a driving means for moving the first detection section to a position in the vicinity of the surface of the first dielectric layer and away from the surface of the first dielectric layer and moving the second detection section to a position in the vicinity of the surface of the second dielectric layer and away from the surface of the second dielectric layer, the driving means being constituted so as to locate the first detecting section and the second detecting section at positions in the vicinity of the surfaces of the first dielectric layer and the second dielectric layer where the first detecting section and the second detecting section face each other.

6. An apparatus for discriminating an optical recording medium in accordance with claim 5, wherein the driving means is constituted so as to move one of the first detecting section and the second detecting section to a position in the vicinity of one of the first dielectric layer and the second dielectric layer while keeping the other of the first detecting section and the second detecting section away from the other of the first dielectric layer and the second dielectric layer and the signal applying means is constituted so as to selectively apply a signal for detection to one of the electrode of the first detecting section and the electrode of the second detecting section.

7. An apparatus for discriminating an optical recording medium in accordance with claim 5, wherein the driving means is constituted as a single driving means.

8. An apparatus for discriminating an optical recording medium in accordance with claim 1, wherein the driving means is constituted so as to bring the first detecting section into contact with the surface of the first dielectric layer and bring the second detecting section into contact with the surface of the second dielectric layer.

9. An apparatus for discriminating an optical recording medium in accordance with claim 1, wherein at least one of the first detecting section and the second detecting section is disposed on a tray of a drive.

10. An apparatus for discriminating an optical recording medium in accordance with claim 9, wherein at least one of the electrode of the first detecting section and the electrode of the second detecting section is disposed around a center of a tray of a drive on which the optical recording medium is to be placed over substantially 180 degrees.

11. An apparatus for discriminating an optical recording medium in accordance with claim 10, wherein at least one of the electrode of the first detecting section and the electrode of the second detecting section includes a first electrode to which a signal for detection is applied and a second electrode at which a signal depending upon the kind of an optical recording medium appears in response to application of the signal for detection to the first electrode.

12. An apparatus for discriminating an optical recording medium in accordance with claim 11, wherein the first electrode and the second electrode are disposed to be spaced from each other and to form at least a part of a substantially annular portion around the center of the tray.

13. An apparatus for discriminating an optical recording medium in accordance with claim 12, wherein the first electrode and the second electrode are disposed to be spaced from each other in a circumferential direction of the optical recording medium to be placed on the tray and over substantially 180 degrees around the center of the tray.

14. An apparatus for discriminating an optical recording medium in accordance with claim 12, wherein the first electrode and the second electrode are disposed to be spaced from each other in a radial direction of the optical recording medium to be placed on the tray and over substantially 180 degrees around the center of the tray.

15. An apparatus for discriminating an optical recording medium in accordance with claim 14, wherein the first electrode and the second electrode are disposed to be spaced from each other in a radial direction of the optical recording medium to be placed on the tray and over substantially 360 degrees around the center of the tray.

16. An apparatus for discriminating an optical recording medium in accordance with claim 1, wherein at least one of the first detecting section and the second detecting section is disposed in a main body of a drive.

17. An apparatus for discriminating an optical recording medium in accordance with claim 16, wherein at least one of the first detecting section and the second detecting section is constituted by a shaft of a roller of a slot-loading mechanism.

18. A method for discriminating an optical recording medium comprising at least a first dielectric layer, a second dielectric layer and a conductive layer formed between the first dielectric layer and the second dielectric layer, the method for discriminating an optical recording medium comprising steps of locating a first detecting section provided with an electrode in the vicinity of a surface of the first dielectric layer, applying a signal for detection to the electrode of the first detecting section, locating a second detecting section provided with an electrode in the vicinity of a surface of the second dielectric layer, and applying a signal for detection to the electrode of the second detecting section, thereby discriminating the kind of the optical recording medium.

* * * * *